(12) United States Patent
Mizuochi et al.

(10) Patent No.: US 9,494,428 B2
(45) Date of Patent: Nov. 15, 2016

(54) ATTITUDE DETERMINATION METHOD, POSITION CALCULATION METHOD, AND ATTITUDE DETERMINATION DEVICE

(75) Inventors: Shunichi Mizuochi, Matsumoto (JP); Anand Kumar, Richmond (CA); Akinobu Sato, Fujimi-machi (JP); Kenji Onda, Matsumoto (JP); Rama Sanjay, Karnataka (IN)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/002,696

(22) PCT Filed: Mar. 1, 2012

(86) PCT No.: PCT/JP2012/055894
§ 371 (c)(1),
(2), (4) Date: Aug. 30, 2013

(87) PCT Pub. No.: WO2012/118232
PCT Pub. Date: Sep. 7, 2012

(65) Prior Publication Data
US 2013/0338915 A1  Dec. 19, 2013

(30) Foreign Application Priority Data

Mar. 2, 2011 (JP) ................................ 2011-045265
Dec. 16, 2011 (JP) ................................ 2011-275235

(51) Int. Cl.
*G01C 21/16* (2006.01)
*G01C 21/12* (2006.01)
(Continued)

(52) U.S. Cl.
CPC ............. *G01C 21/16* (2013.01); *B60G 17/018* (2013.01); *B60G 17/019* (2013.01); *B60G 17/0195* (2013.01); *G01C 9/08* (2013.01); *G01C 21/10* (2013.01); *G01C 21/12* (2013.01); *G01C 21/28* (2013.01); *G01C 25/005* (2013.01); *G01G 19/086* (2013.01); *G01S 19/42* (2013.01);
(Continued)

(58) Field of Classification Search
CPC ...... G01C 21/10; G01C 21/12; G01C 21/16; G01C 25/005; G01C 9/08; H04W 52/0254; B60G 17/018; B60G 17/019; B60G 17/0195; B60G 2400/05; B60G 2400/0513; B60G 2400/0512; G01G 19/086; G01S 19/42; G01S 19/49; G01S 19/53; G01S 5/186; B60T 2250/06
USPC ....... 701/469, 472, 479, 500, 501, 511, 473; 702/94, 95, 141, 142, 153, 150
See application file for complete search history.

(56) References Cited

U.S. PATENT DOCUMENTS 3,237,887 A * 3/1966 Theiss .................... G01C 21/16
244/3.2
5,828,987 A * 10/1998 Tano et al. .................... 702/150
(Continued)

FOREIGN PATENT DOCUMENTS

WO 2007/059134 A1 5/2007

*Primary Examiner* — Thomas G Black
*Assistant Examiner* — Sze-Hon Kong
(74) *Attorney, Agent, or Firm* — Kilpatrick Townsend & Stockton LLP

(57) ABSTRACT

A new method for determining an attitude of a sensor with respect to a moving body is proposed. A movement vector is measured by a sensor mounted in the moving body. In addition, the attitude of the sensor with respect to the moving body is determined using the movement vector measured by the sensor when the moving body starts to move.

6 Claims, 21 Drawing Sheets

(51) Int. Cl.

| | | |
|---|---|---|
| *G01G 19/08* | (2006.01) | |
| *G01C 9/08* | (2006.01) | |
| *G01S 19/42* | (2010.01) | |
| *B60G 17/0195* | (2006.01) | |
| *H04W 52/02* | (2009.01) | |
| *B60G 17/018* | (2006.01) | |
| *G01C 21/10* | (2006.01) | |
| *B60G 17/019* | (2006.01) | |
| *G01S 19/49* | (2010.01) | |
| *G01C 21/28* | (2006.01) | |
| *G01C 25/00* | (2006.01) | |

(52) U.S. Cl.
 CPC .......... *G01S19/49* (2013.01); *H04W 52/0254* (2013.01); *B60G 2400/05* (2013.01); *B60G 2400/0512* (2013.01); *B60G 2400/0513* (2013.01)

(56) References Cited

U.S. PATENT DOCUMENTS

| | | | | |
|---|---|---|---|---|
| 5,986,583 | A * | 11/1999 | Nakano | G01C 21/16 340/988 |
| 6,259,999 | B1 * | 7/2001 | Pantle | B60R 21/013 701/38 |
| 6,532,419 | B1 | 3/2003 | Begin et al. | |
| 6,829,525 | B2 * | 12/2004 | Tanaka et al. | 701/1 |
| 7,216,055 | B1 * | 5/2007 | Horton | G01C 21/16 702/150 |
| 8,195,392 | B2 * | 6/2012 | Watanabe et al. | 701/472 |
| 8,249,800 | B2 * | 8/2012 | Hoshizaki | 701/400 |
| 8,447,518 | B2 * | 5/2013 | Tanino | 701/472 |
| 8,560,235 | B2 * | 10/2013 | Okuyama et al. | 701/494 |
| 8,666,589 | B2 * | 3/2014 | Munnix | 701/30.7 |
| 9,157,737 | B2 * | 10/2015 | Loomis | G01O 5/00 |
| 2004/0260468 | A1 * | 12/2004 | Bang | G01C 25/00 701/505 |
| 2004/0260507 | A1 * | 12/2004 | Chang | G06F 3/0346 702/152 |
| 2005/0080543 | A1 * | 4/2005 | Lu | B60G 17/018 701/70 |
| 2005/0240347 | A1 * | 10/2005 | Yang | G01C 21/16 701/500 |
| 2008/0059034 | A1 * | 3/2008 | Lu | B60T 8/17552 701/71 |
| 2008/0143691 | A1 * | 6/2008 | T. Cook | G06F 3/03545 345/179 |
| 2009/0018772 | A1 * | 1/2009 | Watanabe | G01C 21/165 701/472 |
| 2009/0143972 | A1 * | 6/2009 | Kitamura | A61B 5/1112 701/504 |
| 2009/0326858 | A1 * | 12/2009 | Ueda | G01P 15/18 702/141 |
| 2010/0019963 | A1 | 1/2010 | Gao et al. | |
| 2010/0030471 | A1 * | 2/2010 | Watanabe | G01C 21/26 701/494 |
| 2010/0036557 | A1 * | 2/2010 | Lu | B60T 8/172 701/38 |
| 2011/0077903 | A1 * | 3/2011 | Lee | G06F 1/1626 702/151 |
| 2011/0153156 | A1 * | 6/2011 | Haller | B60T 8/171 701/36 |
| 2011/0202225 | A1 * | 8/2011 | Willis | G01C 21/165 701/31.4 |
| 2011/0307213 | A1 * | 12/2011 | Zhao | G01C 17/30 702/153 |
| 2011/0320164 | A1 * | 12/2011 | Ding | G01P 21/00 702/150 |
| 2012/0022780 | A1 * | 1/2012 | Kulik | G01C 21/28 701/498 |
| 2012/0041702 | A1 * | 2/2012 | Toda et al. | 702/94 |
| 2012/0179385 | A1 * | 7/2012 | Nagashima | A63B 69/0002 702/19 |
| 2012/0326922 | A1 * | 12/2012 | Yang | G01S 19/49 342/357.3 |
| 2013/0179107 | A1 * | 7/2013 | Setoguchi et al. | 702/94 |

\* cited by examiner

ATTITUDE DETERMINATION METHOD, POSITION CALCULATION METHOD, AND ATTITUDE DETERMINATION DEVICE

This application is a National Phase of international Application No. PCT/JP2012/055894, filed Mar. 1, 2012, which claims priority to Japanese Application No. 2011-045265, filed Mar. 2, 2011, and Japanese Application No. 2011-275235, filed Dec. 16, 2011, the entireties of which are incorporated by reference herein.

TECHNICAL FIELD

The present invention relates to a method of determining the attitude of a sensor with respect to a moving body.

BACKGROUND ART

The use of sensors in various fields, such as so-called seamless positioning, motion sensing, and attitude control, has been drawing attention. An acceleration sensor, a gyro sensor, a pressure sensor, a geomagnetic sensor, and the like are widely known as sensors. A technique of calculating the position of a moving body (for example, a bicycle or an automobile, a train, a ship, an airplane, and the like) by performing an inertial navigation operation using a measurement result of a sensor has also been proposed.

In the inertial navigation operation, there is a problem in that the accuracy of position calculation is reduced due to various error components included in the measurement result of a sensor. For this reason, various techniques for improving the accuracy of position calculation have been proposed. For example, PTL 1 discloses a technique of correcting an inertial navigation operation result by applying a Kalman filter using the constraint condition regarding the movement direction of a moving body.

CITATION LIST

Patent Literature

[PTL 1] U.S. Unexamined Patent Application Publication No. 2010/0019963

SUMMARY OF INVENTION

Technical Problem

The technique disclosed in PTL 1 assumes that an error is included in the measurement result of a sensor and estimates errors included in various quantities, such as the position or velocity of a moving body which is a result of the inertial navigation operation, using the constraint condition regarding the movement direction of the moving body. In this technique, however, the correct correspondence relationship between the coordinate system of a sensor and the coordinate system of a moving body should be known.

The measurement result of a sensor is a value in the coordinate system (local coordinate system) of the sensor. The measurement result of the sensor is not a value in the coordinate system of the moving body. Therefore, when using the constraint condition regarding the movement direction of the moving body, it is necessary to perform coordinate transformation between the coordinate system of the sensor and the coordinate system of the moving body or to fix the sensor to the moving body so that the coordinate system of the sensor and the coordinate system of the moving body match correctly each other. However, even if calibration is performed, it is difficult to correctly perform coordinate transformation from the coordinate system of the sensor to the coordinate system of the moving body and it is also difficult to fix the sensor to the moving body so that the coordinate system of the sensor and the coordinate system of the moving body match correctly. A slight error may occur, or an error may increase with time.

In addition, in the case of disposing a portable electronic apparatus, such as a mobile phone, a navigation apparatus, a PDA (Personal Digital Assistant), or a personal computer including a sensor for inertial navigation, so as to be carried by the moving body and performing an inertial navigation operation using the electronic apparatus, it is extremely difficult to correctly know the correspondence relationship between the coordinate system of the sensor and the coordinate system of the moving body.

When correct coordinate transformation between the coordinate system of the sensor and the coordinate system of the moving body is not possible, coherence between the coordinate system of the sensor and the coordinate system of the moving body is not satisfied. Accordingly, an error occurs in the inertial navigation operation result. In addition, a difference between the actual position and the calculated position tends to increase gradually as the inertial navigation operation continues.

In order to know the correct correspondence relationship between the coordinate system of the sensor and the coordinate system of the moving body, it is necessary to determine the correct attitude of the sensor with respect to the moving body.

The present invention has been made in view of the problems described above, and it is an object of the present invention to propose a new technique for determining the attitude of a sensor with respect to a moving body.

Solution to Problem

In order to solve the above-described problem, according to a first aspect of the present invention, there is provided an attitude determination method including: a step of measuring a movement vector by a sensor which is mounted in a moving body and measures the movement vector; and a step of determining a attitude of the sensor with respect to the moving body using the movement vector measured by the sensor when the moving body starts to move.

In addition, according to another aspect of the present invention, there is provided an attitude determination device that determines an attitude of a sensor, which is mounted in a moving body and measures a movement vector, with respect to the moving body using the movement vector measured by the sensor when the moving body starts to move.

According to the first aspect and the like of the present invention, the attitude of the sensor with respect to the moving body is determined using a movement vector measured by the sensor when the moving body starts to move. The movement vector means a vector regarding the movement of a moving body called an acceleration vector or a velocity vector of a moving body. In addition, the attitude of a sensor with respect to a moving body means a relative attitude of the sensor with respect to the moving body. Although described in embodiments in detail later, the attitude of the sensor with respect to the moving body can be determined using a movement vector measured by the sensor when the moving body starts to move.

In addition, according to a second aspect of the present invention, in the attitude determination method according to the first aspect of the present invention, a step of compensating for a measurement result of the sensor using a first constraint condition regarding a velocity of the moving body when the moving body is in a stop state may be further included.

According to the second aspect of the present invention, when the moving body is in a stop state, the measurement result of the sensor is compensated for using the first constraint condition regarding the velocity of the moving body. In this case, the attitude of the sensor can be determined using the movement vector compensated for when the moving body is in a stop state, in combination with the first aspect of the present invention. As a result, it becomes possible to perform attitude determination more accurately.

In addition, according to a third aspect of the present invention, in the attitude determination method according to the first or second aspect of the present invention, the step of determining the attitude may be determining at least one of a pitch component and a yaw component without determining a roll component of the attitude with respect to the moving body.

According to the third aspect of the present invention, the attitude of the sensor can be easily determined by determining at least one of the pitch component and the yaw component without determining the roll component of the attitude with respect to the moving body.

In addition, according to a fourth aspect of the present invention, in the attitude determination method according to any one of the first to third aspects of the present invention, the step of measuring the movement vector may be measuring a movement vector in an absolute coordinate system which is a coordinate system for determining a moving space of the moving body, and the step of determining the attitude may be determining the attitude of the sensor using the movement vector and a direction of the sensor expressed in the absolute coordinate system.

According to the fourth aspect, the attitude of the sensor with respect to the moving body is determined using a movement vector in the absolute coordinate system for determining the moving space of the moving body and the direction of the sensor expressed in the absolute coordinate system. If the direction of the sensor expressed in the absolute coordinate system is known, the movement vector in the absolute coordinate system can be coordinate-transformed to that in the coordinate system of the sensor. Then, the attitude of the sensor can be appropriately determined using the movement vector after transformation.

In addition, according to a fifth aspect of the present invention, in the attitude determination method according to any one of the first to third aspects of the present invention, the step of determining the attitude may include: a step of calculating a velocity vector in a local coordinate system, which is a measurement coordinate system of the sensor, using a movement vector measured by the sensor when the moving body is stopped and a movement vector measured when the moving body starts to move; and a step of determining the attitude of the sensor using the velocity vector.

According to the fifth aspect of the present invention, it is possible to calculate a velocity vector after removing a bias error and the like of the sensor by calculating a velocity vector in the local coordinate system, which is a measurement coordinate system of the sensor, using a movement vector measured by the sensor when the moving body is stopped and a movement vector measured when the moving body starts to move.

In addition, according to a sixth aspect of the present invention, in the attitude determination method according to any one of the first to fifth aspects of the present invention, the step of determining the attitude may be determining the attitude using the movement vector when the stop of the moving body is released and the velocity or acceleration of the moving body reaches a predetermined threshold value.

According to the sixth aspect of the present invention, the attitude is determined using the movement vector when the stop of the moving body is released and the velocity or acceleration of the moving body reaches a predetermined threshold value. By performing attitude determination when the velocity or acceleration of the moving body reaches a predetermined value without performing attitude determination immediately even if the stoppage of the moving body is released, it is possible to improve the accuracy of attitude determination.

In addition, according to a seventh aspect of the present invention, there is provided a position calculation method including: a step of determining the attitude using the attitude determination method according to any one of the first to sixth aspects of the present invention; and a step of calculating a position of the moving body using the attitude and the movement vector.

According to the seventh aspect of the present invention, the position of the moving body can be appropriately calculated using the movement vector and the attitude determined using the attitude determination method according to the aspect described above.

Moreover, according to an eighth aspect of the present invention, in the position calculation method according to the seventh aspect of the present invention, the step of calculating the position may include: a step of calculating an absolute coordinate position of the moving body in the absolute coordinate system using the movement vector; a step of performing coordinate transformation of the absolute coordinate position to a moving body coordinate position based on the moving body using the attitude and a direction of the sensor expressed in the absolute coordinate system; and a step of correcting the absolute coordinate position using the moving body coordinate position and a second constraint condition regarding a movement direction of the moving body.

According to the eighth aspect of the present invention, the absolute coordinate position of the moving body in the absolute coordinate system can be calculated using the movement vector. For example, the position of a moving body is calculated by integrating a movement vector in the absolute coordinate system. In order to associate the absolute coordinate system with the coordinate system having a moving body as a reference, a relative attitude of the sensor with respect to the moving body and the direction of the sensor expressed in the absolute coordinate system are needed. Then, the absolute coordinate position is coordinate-transformed to the moving body coordinate position using the attitude of the sensor, which is determined using the attitude determination method described above, and the direction of the sensor expressed in the absolute coordinate system. As a result, an operation in the coordinate system having a moving body as a reference becomes possible. In addition, the absolute coordinate position of the moving body can be appropriately corrected using the second constraint condition regarding the movement direction of the moving body and the moving body coordinate position.

DESCRIPTION OF EMBODIMENTS

Hereinafter, an example of a preferred embodiment of the present invention will be described with reference to the drawings. Here, it is needless to say that embodiments to which the present invention can be applied are not limited to the embodiment described below.

1. Principles 1-1. Entire System

Figure 1:
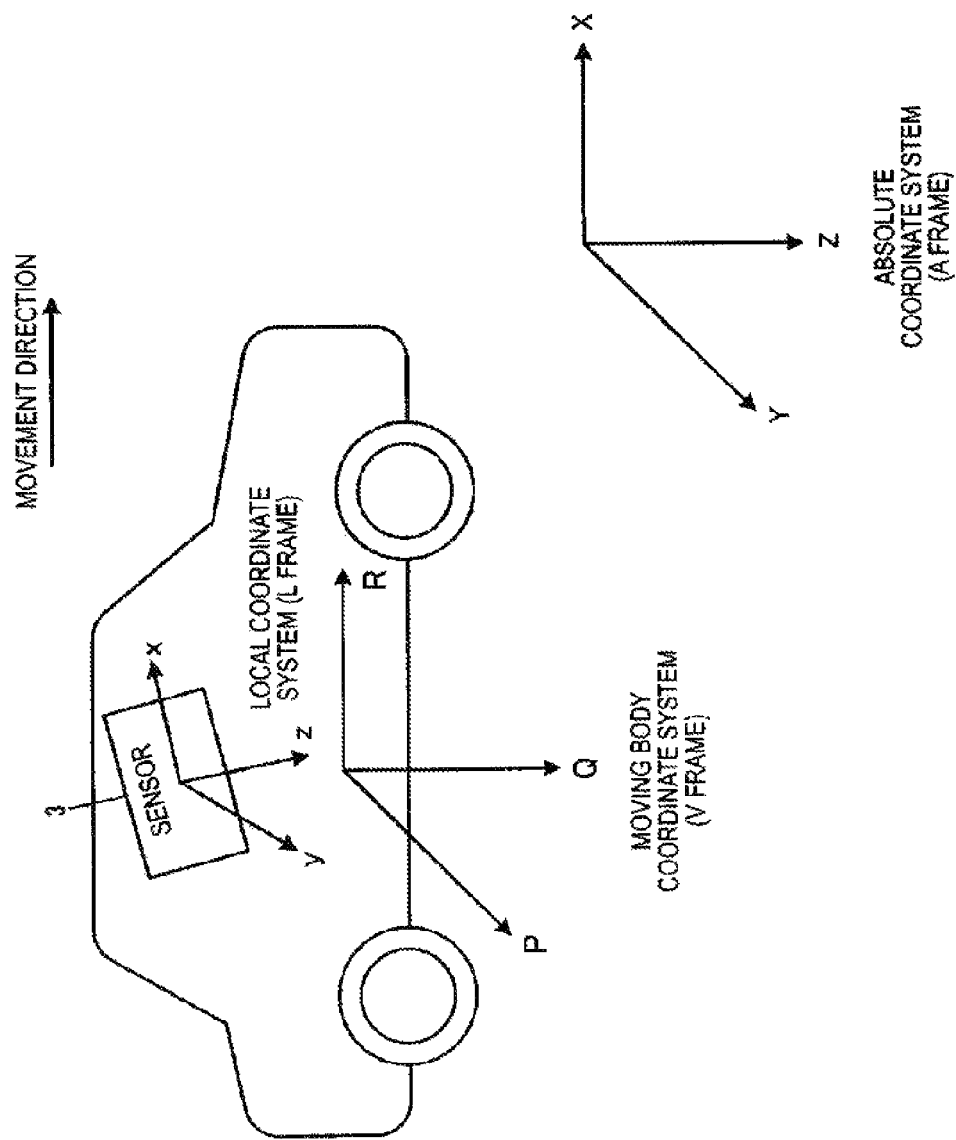
FIG. 1 is a system configuration view of the entire system.

FIG. 1 is a view showing an example of the system configuration of the entire system related to an attitude determination method and a position calculation method in the present embodiment. The entire system is configured as a system having a moving body in which a sensor 3 is mounted. Although the moving body may be any of a bicycle or an automobile (including a four-wheeled vehicle and a motorbike), a train, an airplane, a ship, and the like, the present embodiment will be described using a four-wheeled vehicle as a moving body.

In the present embodiment, three types of coordinate systems are defined. The first coordinate system is a local coordinate system which is a sensor coordinate system corresponding to the sensor 3. In this specification, the local coordinate system is also called an L (Local) frame. The local coordinate system is a three-dimensional Cartesian coordinate system corresponding to the sensor 3. In the present embodiment, three axes of the local coordinate system are written as x, y, and z axes.

The second coordinate system is a moving body coordinate system corresponding to the moving body. In this specification, the moving body coordinate system is also called a V (vehicle) frame. For example, the V frame is defined as a three-dimensional Cartesian coordinate system in which a back and forth direction (front direction of a moving body is positive) is a roll axis (R axis), a left and right direction (right direction is positive) is a pitch axis (P axis), and a vertical direction (vertically downward direction is positive) is a yaw axis (Q axis). In the present embodiment, three axes of the moving body coordinate system are written as R, P, and Q axes.

The third coordinate system is an absolute coordinate system which is a coordinate system which determines the moving space of a moving body. In this specification, the absolute coordinate system is also called an A (Absolute) frame. For example, the A frame is defined as the NED (North East Down) coordinate system known as a north east down coordinate system or the ECEF (Earth Centered Earth Fixed) coordinate system known as an earth centered earth fixed coordinate system. In the present embodiment, three axes of the absolute coordinate system are written as X, Y, and Z axes.

The sensor 3 is various kinds of sensors mounted in a moving body. For example, when applying the sensor 3 to an inertial navigation system which calculates the position or the velocity independently using a measurement result of the sensor 3, a sensor for inertial navigation (inertial sensor) such as an acceleration sensor 3A or an attitude sensor 3B is used as the sensor 3.

The acceleration sensor 3A is a sensor which detects the acceleration of a moving body in the local coordinate system. For example, an MEMS sensor using the technique of MEMS (Micro Electro Mechanical System) is used. The acceleration sensor 3A is fixed to the moving body. The measurement value of the acceleration sensor 3A is acceleration of the moving body measured in the local coordinate system.

The attitude sensor 3B is a sensor for detecting the absolute attitude which is a direction of the sensor 3 in the absolute coordinate system. For example, a sensor, such as a gyro sensor 3C or a magnetic sensor, is used. The attitude sensor 3B may be formed as a single gyro sensor 3C or a single magnetic sensor or may be formed by combining these sensors. In addition, the attitude sensor 3B may also be configured to include an acceleration sensor. The attitude sensor 3B is fixed to the moving body. The measurement value of the attitude sensor 3B is a direction of the sensor 3 expressed in the absolute coordinate system.

The acceleration or the velocity of a moving body has both direction and magnitude. Therefore, a scalar and a vector will be appropriately distinguished for explanation in this specification. In principle, it is assumed that the acceleration or the velocity expresses the magnitude (scalar quantity) of acceleration or velocity and an acceleration vector or a velocity vector expresses acceleration or velocity when both direction and magnitude are taken into consideration. Moreover, in the present embodiment, the acceleration vector and the velocity vector of a moving body are collectively called a "movement vector" of the moving body. In addition, in order to clarify various quantities defined in each coordinate system, explanation will be given in a state where the type of the coordinate system is added to the head of words indicating each of the various quantities. For example, the acceleration vector expressed in the local coordinate system is called a "local coordinate acceleration vector", and the acceleration vector expressed in the absolute coordinate system is called an "absolute coordinate acceleration vector". This is the same for other various quantities.

In addition, the attitude of the sensor 3 is expressed by the Euler angles of a roll angle, a pitch angle, and a yaw angle. The direction of the sensor 3 expressed in the absolute coordinate system is expressed as an "absolute attitude", and the attitude angle is called an "absolute attitude angle". In addition, a relative attitude of the sensor 3 to the moving body (relative attitude) is expressed as a "mounting attitude", and the attitude angle (relative attitude angle) is called a "mounting attitude angle".

In addition, in drawings referred to in the following explanation, double lines indicate blocks of various kinds of sensors 3 and a single line indicates a processing block which performs arithmetic processing using a measurement result of the sensor 3. The processing block shown by the single line is a processing block in which a processor mounted in the sensor 3 or a processor (host processor) mounted in an electronic apparatus is a main body of processing. In addition, it is assumed that the main body of processing of each processing block can be appropriately set according to a system to which the present invention is applied.

1-2. Mounting Attitude Determining Method

A mounting attitude determining method in the present embodiment will be described. One object is to determine a mounting attitude, which is a relative attitude of the sensor 3 with respect to a moving body, when the sensor 3 is fixed to the moving body. In the present embodiment, the mounting attitude of the sensor 3 is determined using a movement vector measured by the sensor 3 when a moving body starts to move. As described above, a velocity vector and an acceleration vector are included in the movement vector. Therefore, in the present embodiment, the mounting attitude of the sensor 3 is determined using a velocity vector or an acceleration vector measured when a moving body starts to move.

(1) First Mounting Attitude Determination Method

Figure 2:
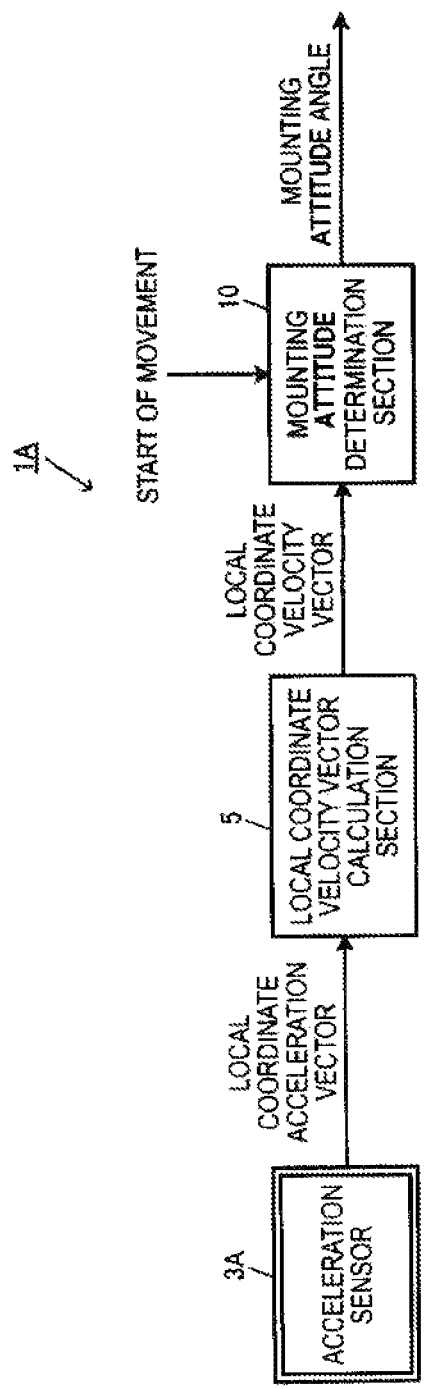
FIG. 2 is a system configuration view of a first mounting attitude determination system.

FIG. 2 is a system configuration view of a first mounting attitude determination system 1A (first attitude determination device) related to the first mounting attitude determination method. The first mounting attitude determination system 1A has an acceleration sensor 3A, a local coordinate velocity vector calculation section 5, and a mounting attitude determination section 10, for example.

The local coordinate velocity vector calculation section 5 calculates a local coordinate velocity vector by executing integration and addition processing on the local coordinate acceleration vector input from the acceleration sensor 3A. In the present embodiment, "integration" means adding values of a predetermined time cumulatively. In addition, "addition" means adding a result obtained by integration to a result updated last.

Specifically, the local coordinate velocity vector calculation section 5 calculates a variation of a velocity vector, which is expressed in the local coordinate system, for a predetermined time by integrating the local coordinate acceleration vector of the predetermined time. Then, the local coordinate velocity vector calculation section 5 newly calculates and updates a local coordinate velocity vector by adding the calculated variation of the velocity vector to the local coordinate velocity vector updated last.

The mounting attitude determination section 10 determines a mounting attitude using the local coordinate velocity vector input from the local coordinate velocity vector calculation section 5. The mounting attitude determination section 10 determines the attitude (mounting attitude) of the sensor 3 with respect to the moving body using the velocity vector measured when the moving body starts to move from the stop state.

In the present embodiment, when the moving body is in a stop state, a measurement result of the sensor 3 is compensated for using the constraint condition regarding the velocity of the moving body (first constraint condition). If the moving body is in a stop state, ideally, the velocity vector of the moving body is a zero vector. Accordingly, when the moving body is in a stop state, a motion model that each component of the velocity vector of the moving body is 0 can be applied. The velocity vector of the moving body referred to herein is a velocity vector in the moving body coordinate system (V frame).

It is possible to apply a method of correcting the velocity vector of a moving body on the basis of the motion model described above. Specifically, a technique may be mentioned in which a velocity constraint condition at the time of stop, in which each component of a velocity vector of a moving body is 0 when the moving body is in a stop state, is given and a measurement result of the sensor 3 is corrected using a Kalman filter (KF), for example.

The Kalman filter is one of estimation methods which estimate a state of a system on the basis of a probability theory using the amount of external observation changing every moment. For example, a method may be considered in which a "state" to be estimated is set to an error included in the measurement result of the sensor 3 and the measurement result of the sensor 3 is corrected using the above-described velocity constraint condition as "observation information". Moreover, a method of resetting the measurement result of the sensor 3 on the basis of the above-described velocity constraint condition at the time of stoppage may also be considered in addition to the Kalman filter. That is, the sensor 3 is calibrated using the velocity constraint condition at the time of stoppage.

As described above, when the moving body is in a stop state, an error included in the measurement result of the sensor 3 can be reduced (made small) by compensating for the measurement result of the sensor 3 using the constraint condition (first constraint condition) regarding the velocity of the moving body. If the moving body starts to move in a state where an error has been reduced, the measurement result of the sensor 3 is reduced for a while. Therefore, in the present embodiment, the attitude (mounting attitude) of the sensor 3 with respect to the moving body is determined using a movement vector measured by the sensor 3 when the moving body starts to move.

There is a relationship of the following Expression (1) between a velocity vector expressed in the local coordinate system (local coordinate velocity vector) and a velocity vector expressed in the moving body coordinate system (moving body coordinate velocity vector).

[Expression 1]

$$\begin{bmatrix} v_R^V \\ v_P^V \\ v_Q^V \end{bmatrix} = C_L^V \begin{bmatrix} v_x^L \\ v_y^L \\ v_z^L \end{bmatrix} \quad (1)$$

In Expressions in this specification, a component of a velocity vector is expressed as a lowercase letter "v". Moreover, in the notation of a velocity vector, the type of the coordinate system is expressed by an uppercase superscript. "L", "V", and "A" mean a local coordinate system, a moving body coordinate system, and an absolute coordinate system, respectively. In addition, a component of each axis of the corresponding coordinate system is expressed by a lowercase subscript. For example, the notation of "x", "y", and "z" is used in the case of three axes of the local coordinate system.

In addition, in this specification, a coordinate transformation matrix is expressed by uppercase "C". In each coordinate transformation matrix, a subscript indicates a coordinate system before coordinate transformation and a superscript indicates a coordinate system after coordinate transformation. For example, "$C_L^V$" indicates a coordinate transformation matrix from the local coordinate system (L frame) to the moving body coordinate system (V frame), and "$C_A^V$" indicates a coordinate transformation matrix from the absolute coordinate system (A frame) to the local coordinate system (L frame).

Here, a constraint condition regarding the movement direction of a moving body (second constraint condition) is applied. For example, if the moving body is a four-wheeled vehicle, it can be assumed that the four-wheeled vehicle does not jump or drift in normal traveling. That is, assuming that velocity components of the moving body in horizontal and vertical directions are 0, the constraint condition in which velocity components in the Q-axis direction and the P-axis direction of the moving body coordinate system (V frame) are 0 is set. That is, the constraint condition $\{v_P^V = v_Q^V = 0\}$ is set for the velocity of the moving body.

In this case, from Expression (1), the pitch angle "θ" which is a pitch component of the mounting attitude and a yaw angle "ψ" which is a yaw component can be calculated as shown in Expressions (2) and (3).

[Expression 2]

$$\theta = \arctan \frac{-v_z^L}{\sqrt{(v_x^L)^2 + (v_y^L)^2}} \quad (2)$$

[Expression 3]

$$\psi = \arctan 2(v_y^L, v_x^L) \quad (3)$$

The pitch angle "θ" and the yaw angle "ψ" indicate rotation angles of the sensor 3 around the P and Q axes of the moving body coordinate system, respectively. That is, it can be said that the pitch angle "θ" and the yaw angle "ψ" indicate relative attitude angles of the sensor 3 with respect to the moving body.

In addition, the velocity of an automobile immediately after the automobile starts to move becomes a value close to 0. If the mounting attitude angle is calculated according to Expressions (2) and (3) in this state, sufficient arithmetic precision may not be guaranteed by the operation of floating-point numbers. Therefore, it is effective to determine a mounting attitude when the velocity or acceleration becomes large to some extent without immediately calculating the mounting attitude angle even if the automobile starts to move. For example, it is effective to determine a mounting attitude when a predetermined time (set as a time of 1 second or less) elapses immediately after the brake control of an automobile is released or to determine a mounting attitude when the automobile reaches a predetermined speed of "1 km/h or more and 20 km/h or less" after the brake control is released.

(2) Second Mounting Attitude Determination Method

Figure 3:
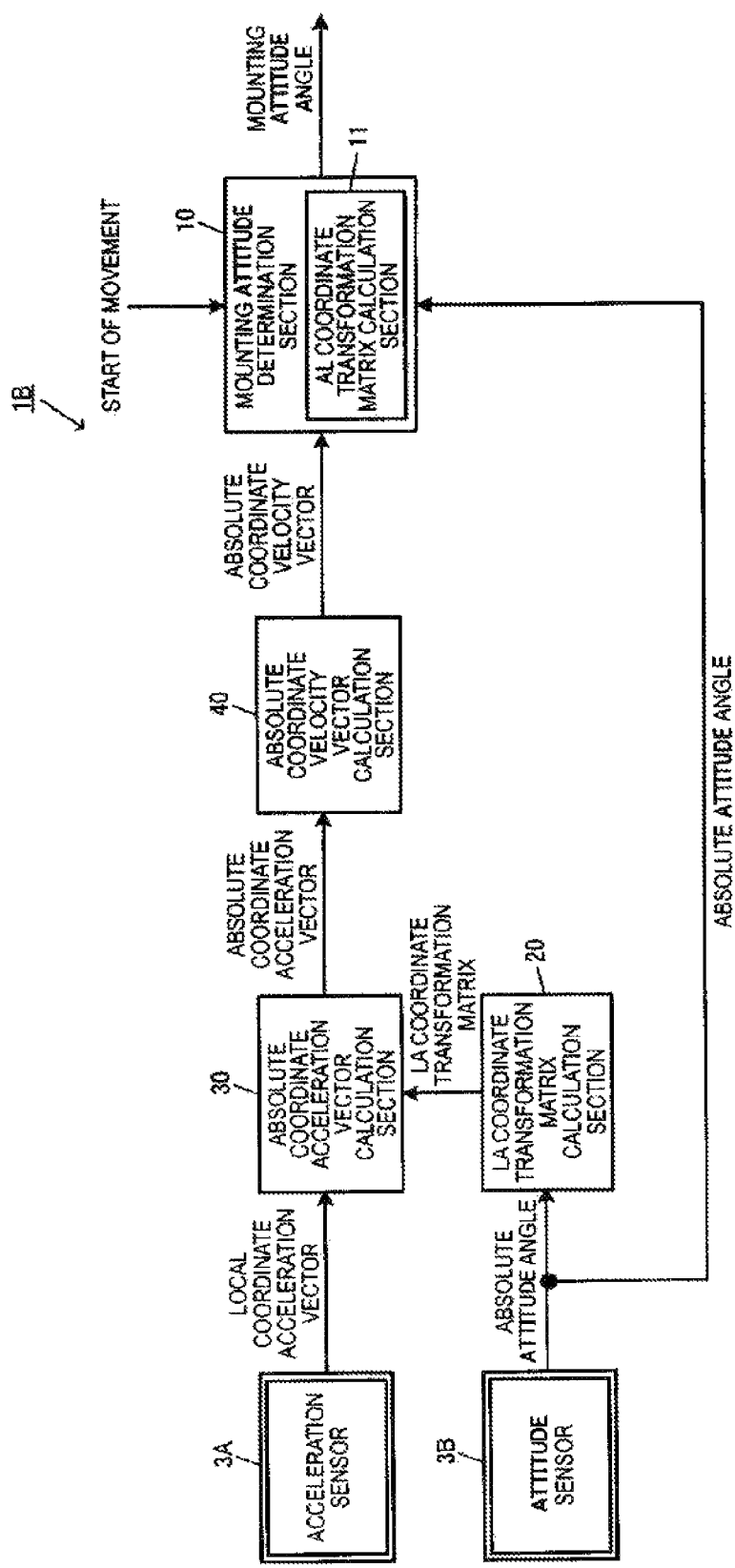
FIG. 3 is a system configuration view of a second mounting attitude determination system.

FIG. 3 is a system configuration view of a second mounting attitude determination system 1B (second attitude determination device) related to a second mounting attitude determination method. The second mounting attitude determination system 1B has an acceleration sensor 3A, a attitude sensor 3B, an LA coordinate transformation matrix calculation section 20, an absolute coordinate acceleration vector calculation section 30, an absolute coordinate velocity vector calculation section 40, and a mounting attitude determination section 10, for example. In the present embodiment, the acceleration sensor 3A and the attitude sensor 3B are integrally formed so as to measure values in the common local coordinate system.

The LA coordinate transformation matrix calculation section 20 calculates a coordinate transformation matrix from the local coordinate system to the absolute coordinate system (hereinafter, referred to as an "LA coordinate transformation matrix") using the absolute attitude angle of the sensor 3 (direction of the sensor 3 expressed in the absolute coordinate system) input from the attitude sensor 3B. In addition, since the LA coordinate transformation matrix itself is well known, explanation using Expression and the like will be omitted.

The absolute coordinate acceleration vector calculation section 30 performs coordinate transformation of the local coordinate acceleration vector, which is input from the acceleration sensor 3A, to an absolute coordinate acceleration vector using the LA coordinate transformation matrix input from the LA coordinate transformation matrix calculation section 20.

The absolute coordinate velocity vector calculation section 40 calculate an absolute coordinate velocity vector by performing integration and addition processing on the absolute coordinate acceleration vector input from the absolute coordinate acceleration vector calculation section 30. That is, by integrating the absolute coordinate acceleration vector of a predetermined time, a variation of the velocity vector of the moving body for the predetermined time is calculated. Then, the absolute coordinate velocity vector calculation section 40 newly calculates and updates an absolute coordinate velocity vector by adding the calculated variation of the velocity vector to the absolute coordinate velocity vector updated last.

The mounting attitude determination section 10 determines the mounting attitude of the acceleration sensor 3A using the absolute coordinate velocity vector input from the absolute coordinate velocity vector calculation section 40 and the absolute attitude angle input from the attitude sensor 3B. The mounting attitude determination section 10 has as a functional section an AL coordinate transformation matrix calculation section 11 which calculates a coordinate transformation matrix from the absolute coordinate system to the local coordinate system (hereinafter, referred to as an "AL coordinate transformation matrix").

There is a relationship of the following Expression (4) between a velocity vector expressed in the absolute coordinate system (absolute coordinate velocity vector) and a velocity vector expressed in the moving body coordinate system (moving body coordinate velocity vector).

[Expression 4]

$$\begin{bmatrix} v_R^V \\ v_P^V \\ v_Q^V \end{bmatrix} = C_L^V C_A^V \begin{bmatrix} v_X^A \\ v_Y^A \\ v_Z^A \end{bmatrix} \quad (4)$$

Here, "$C_A^V$" indicates an AL coordinate transformation matrix. In addition, "$C_L^V$" indicates a coordinate transformation matrix from the local coordinate system (L frame) to the moving body coordinate system (V frame) (hereinafter, referred to as an "LV coordinate transformation matrix").

From Expression (4), it can be seen that two steps of coordinate transformation is required in order to associate the absolute coordinate system with the moving body coordinate system. That is, as a first step, coordinate transformation of an absolute coordinate velocity vector to a local coordinate velocity vector is performed using an AL coordinate transformation matrix "$C_A^L$". Then, as a second step, coordinate transformation of the local coordinate velocity vector to a moving body coordinate velocity vector is performed using an LV coordinate transformation matrix "$C_L^V$".

The AL coordinate transformation matrix "$C_A^L$" is a matrix set by the direction (absolute attitude) of the sensor 3 expressed in the absolute coordinate system, and is an inverse matrix of the LA coordinate transformation matrix calculated by the LA coordinate transformation matrix calculation section 20. In this case, if coordinate transformation of the absolute coordinate velocity vector to the local coordinate velocity vector is performed using the AL coordinate transformation matrix, Expression (4) becomes equal to Expression (1). That is, since the following Expression (5) is satisfied, Expression (1) is derived from Expressions (4) and (5).

[Expression 5]

$$C_A^L \begin{bmatrix} v_X^A \\ v_Y^A \\ v_Z^A \end{bmatrix} = \begin{bmatrix} v_x^L \\ v_y^L \\ v_z^L \end{bmatrix} \quad (5)$$

Thus, since Expression (1) can be derived, the mounting attitude can be determined in the same manner as in the first mounting attitude determination method. That is, in the moving body coordinate system (V frame), the mounting attitude angle is calculated according to Expressions (2) and (3) on the basis of the constraint condition in which velocity components in the Q-axis direction and the P-axis direction are 0 $\{v_P^V = v_Q^V = 0\}$.

In order to realize the above, the AL coordinate transformation matrix calculation section 11 of the mounting attitude determination section 10 calculates an AL coordinate transformation matrix using the absolute attitude angle input from the attitude sensor 3. Then, the mounting attitude determination section 10 performs coordinate transformation of the absolute coordinate velocity vector, which is input from the absolute coordinate velocity vector calculation section 40, to a local coordinate velocity vector using the AL coordinate transformation matrix calculated by the AL coordinate transformation matrix calculation section 11. Then, using the local coordinate velocity vector, the mounting attitude angle is finally calculated according to Expressions (2) and (3).

1-3. Position Calculation Method

Next, a position calculation method for calculating the position of a moving body using the movement vector and the mounting attitude of the sensor 3 determined using the above mounting attitude determination method will be described.

(1) First Position Calculation Method

Figure 4:
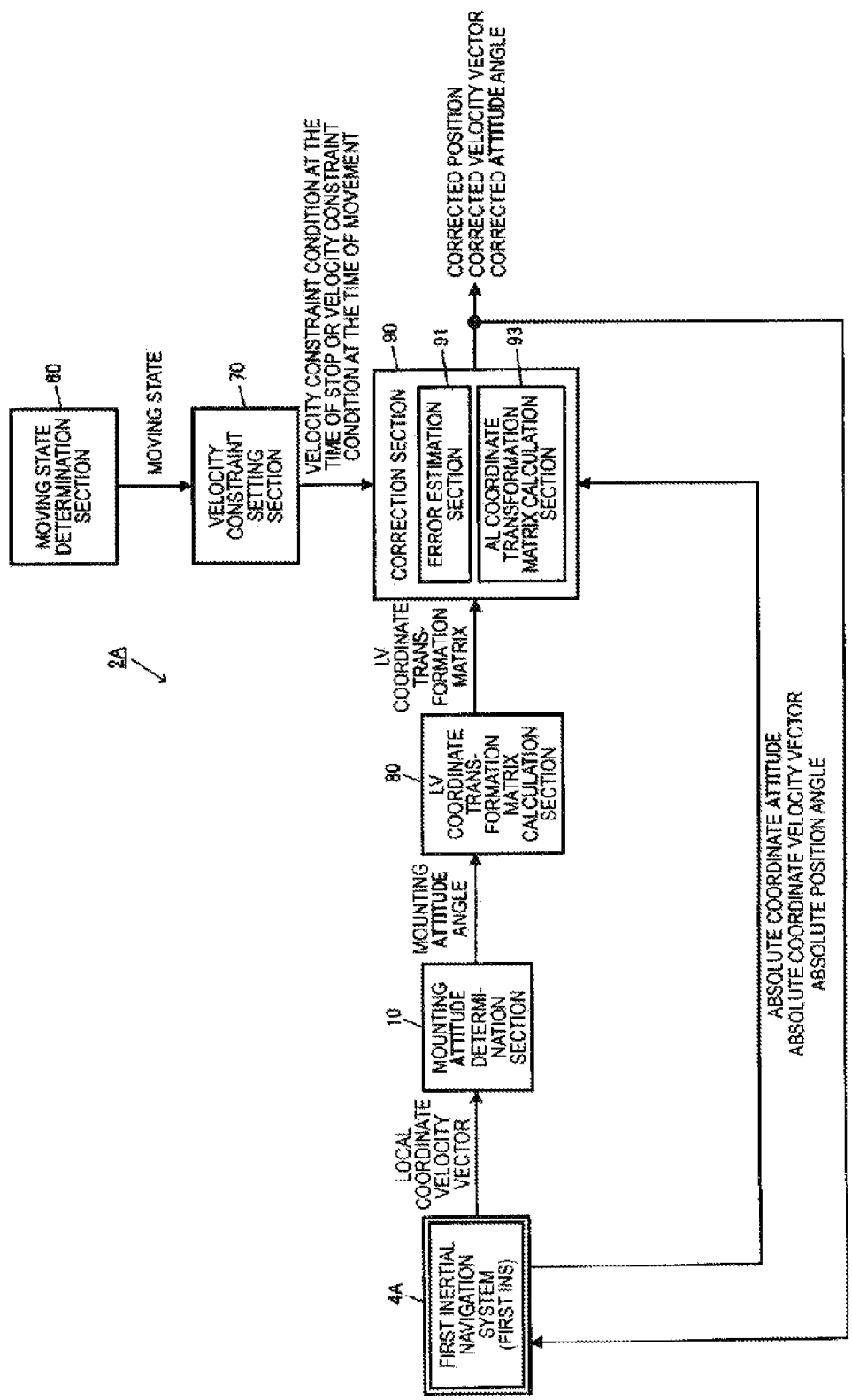
FIG. 4 is a system configuration view of a first position calculation system.

FIG. 4 is a system configuration view of a first position calculation system 2A (first position calculation device) related to a first position calculation method. The first position calculation system 2A has a first inertial navigation system (first INS) 4A, a mounting attitude determination section 10, a moving state determination section 60, a velocity constraint setting section 70, an LV coordinate transformation matrix calculation section 80, and a correction section 90, for example.

Figure 5:
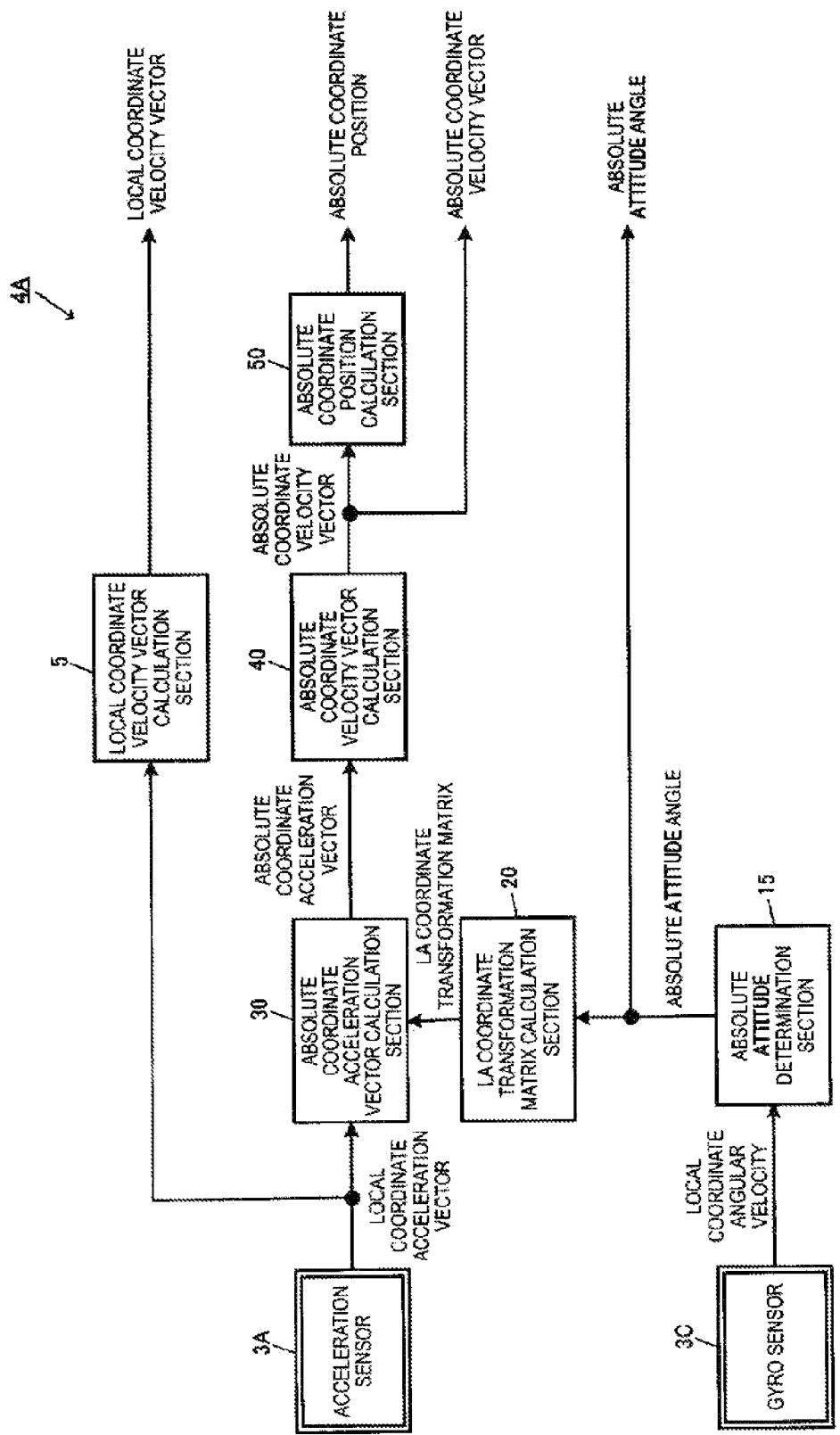
FIG. 5 is a system configuration view of a first inertial navigation system.

The first inertial navigation system 4A is an inertial navigation system known as an INS, and an example of the system configuration is shown in FIG. 5. The first inertial navigation system 4A has an acceleration sensor 3A, a gyro sensor 3C, a local coordinate velocity vector calculation section 5, an absolute attitude determination section 15, an LA coordinate transformation matrix calculation section 20, an absolute coordinate acceleration vector calculation section 30, an absolute coordinate velocity vector calculation section 40, and an absolute coordinate position calculation section 50, for example.

The local coordinate velocity vector calculation section 5 calculates a local coordinate velocity vector by executing integration and addition processing on the local coordinate acceleration vector input from the acceleration sensor 3A.

The absolute attitude determination section 15 determines an absolute attitude angle by executing integration and addition processing on the local coordinate angular velocity input from the gyro sensor 3C. Specifically, a variation of the attitude angle of the sensor 3 from the given reference attitude which is expressed in the absolute coordinate system is calculated by integrating the local coordinate angular velocity input from the gyro sensor 3C. Then, the absolute attitude angle is newly calculated and updated by adding the attitude angle variation to the reference attitude.

The LA coordinate transformation matrix calculation section 20, the absolute coordinate acceleration vector calculation section 30, and the absolute coordinate velocity vector calculation section 40 calculate an LA coordinate transformation matrix, an absolute coordinate acceleration vector, and an absolute coordinate velocity vector, respectively, as in FIG. 3.

The absolute coordinate position calculation section 50 calculates the absolute coordinate position of a moving body by executing integration and addition processing on the absolute coordinate velocity vector input from the absolute coordinate velocity vector calculation section 40. That is, by integrating the absolute coordinate velocity vector of a predetermined time, a position variation for the predetermined time is calculated. Then, the absolute coordinate position calculation section 50 newly calculates and updates an absolute coordinate position by adding the calculated position variation to the absolute coordinate position updated last.

The local velocity vector calculated by the local coordinate velocity vector calculation section 5, the absolute attitude angle calculated by the absolute attitude determination section 15, the absolute coordinate velocity vector calculated by the absolute coordinate velocity vector calculation section 40, and the absolute coordinate position calculated by the absolute coordinate position calculation section 50 are output from the first inertial navigation system 4A.

Returning to the explanation of FIG. 4, the mounting attitude determination section 10 determines the mounting attitude of the first inertial navigation system 4A with respect to the moving body using the local coordinate velocity vector input from the first inertial navigation system 4A.

The moving state determination section 60 determines a moving state of the moving body. Determination regarding the moving state of the moving body can be realized by various kinds of methods. For example, a method of performing determination using a measurement result of the acceleration sensor 3A or the gyro sensor 3C provided in the inertial navigation system may be mentioned. In addition, when the moving body is an automobile, a moving state of the moving body may be determined using the speed measured by a speed detection system (for example, a speed pulse) mounted in the automobile.

The velocity constraint setting section 70 sets the velocity constraint condition applied to the correction section 90 on the basis of the moving state input from the moving state determination section 60. In the present embodiment, two types of "velocity constraint condition at the time of stop" which is a velocity constraint condition when a moving body is in a stop state and "velocity constraint condition at the time of movement" which is a velocity constraint condition when the moving body moves are changeably set.

The velocity constraint condition at the time of stop is a first constraint condition regarding the velocity of a moving body, and is a constraint condition applied when the moving body is in a stop state. Specifically, the velocity constraint condition at the time of stop is a constraint condition set on the assumption that the velocity vector of a moving body is a zero vector when the moving body is stopped. Although the coordinate system in which the velocity constraint condition at the time of stop is applied is arbitrary, applying it in the absolute coordinate system may be considered, for example. In this case, for example, $\{v_X^A = v_Y^A = v_Z^A = 0\}$ is given as the constraint condition.

The velocity constraint condition at the time of movement is a second constraint condition regarding the movement direction of a moving body, and is a constraint applied when the moving body moves. As described above, if the moving body is a four-wheeled vehicle, the velocity constraint condition at the time of movement is a constraint condition set on the assumption that the moving body does not jump or drift in normal traveling. In this case, for example, $\{v_P^V = v_Q^V = 0\}$ is given as the constraint condition. This constraint condition is an effective condition in the moving body coordinate system.

The LV coordinate transformation matrix calculation section 80 calculates a coordinate transformation matrix from the local coordinate system to the moving body coordinate system (hereinafter, referred to as an "LV coordinate transformation matrix") using the mounting attitude angle input from the mounting attitude determination section 10. In addition, since the LA coordinate transformation matrix itself is well known, explanation using Expressions and the like will be omitted.

The correction section 90 corrects inertial navigation operation results input from the first inertial navigation system 4A. It is preferable that the correction section 90 be configured to correct at least an absolute coordinate position of the inertial navigation operation results. That is, it is preferable to configure the correction section 90 so as to perform an error estimation operation for at least the absolute coordinate position and estimate the absolute coordinate position using the estimated position error.

In the present embodiment, a case is exemplified in which the correction section 90 corrects not only the absolute coordinate position but also the absolute coordinate velocity vector and the absolute attitude angle collectively. The correction section 90 has an error estimation section 91 and an AL coordinate transformation matrix calculation section 93.

The error estimation section 91 estimates an error included in the inertial navigation operation result input from the first inertial navigation system 4A (hereinafter, referred to as an "inertial navigation operation error") by performing a predetermined error estimation operation. Various methods may be applied as a method of estimating an inertial navigation operation error. As a typical method, a Kalman filter may be applied.

Specifically, a state vector "X" is set as in the following Expression (6), for example.

[Expression 6]

$$X = \begin{bmatrix} \delta P \\ \delta V \\ \delta A \end{bmatrix} \tag{6}$$

Here, "$\delta P$", "$\delta V$", and "$\delta A$" indicate an error of an absolute coordinate position (position error), an error of an absolute coordinate velocity vector (velocity vector error), and an error of an absolute attitude angle (attitude angle error), respectively.

When the moving body is in a stop state, for example, an observation vector at the time of stop "$Z_{stop}$" shown in the following Expression (7) is set according to the velocity constraint condition at the time of stop. In addition, when the moving body moves, for example, an observation vector at the time of movement "$Z_{move}$" shown in the following Expression (8) is set according to the velocity constraint condition at the time of movement.

[Expression 7]

$$Z_{stop} = \begin{bmatrix} 0 \\ 0 \\ 0 \end{bmatrix} - \begin{bmatrix} v_X^A \\ v_Y^A \\ v_Z^A \end{bmatrix} \tag{7}$$

[Expression 8]

$$Z_{move} = \begin{bmatrix} |V| \\ 0 \\ 0 \end{bmatrix} - \begin{bmatrix} v_R^V \\ v_P^V \\ v_Q^V \end{bmatrix} \tag{8}$$

In Expression (8), |V| indicates the magnitude of the velocity. The magnitude of the velocity may be calculated as the magnitude (scalar) of an absolute coordinate velocity vector obtained by inertial navigation operation or may be calculated as the magnitude of a velocity acquired from an external system, such as a velocity detection system.

The state vector "X" and the observation vector "Z" are set as described above, and an estimation operation (time update) and a correction operation (observation update) based on the theory of the Kalman filter are performed to calculate an estimate (state estimate) of the state vector "X".

In the above definition Expression, the state vector "X" is defined as an inertial navigation operation error expressed in the absolute coordinate system. Since the observation vector at the time of stop "$Z_{stop}$" is defined in the absolute coordinate system, an operation in the same coordinate system is possible. However, since the observation vector at the time of movement "$Z_{move}$" is defined in the moving body coordinate system, an operation in the same coordinate system is difficult.

Therefore, the AL coordinate transformation matrix calculation section 93 calculates an AL coordinate transformation matrix using the absolute attitude angle input from the first inertial navigation system 4A. Then, the state vector "X" expressed in the absolute coordinate system is coordinate-transformed to the state vector "X" expressed in the moving body coordinate system using the calculated AL coordinate transformation matrix and the LV coordinate transformation matrix input from the LV coordinate transformation matrix calculation section 80. That is, two steps of coordinate transformation into the state vector "X" are performed using two kinds of coordinate transformation matrices.

Similarly, using the AL coordinate transformation matrix and the LV coordinate transformation matrix, an absolute coordinate position, an absolute coordinate velocity vector, and an absolute attitude angle which are inertial navigation operation results are coordinate-transformed to a moving body coordinate position, a moving body coordinate velocity vector, and a moving body attitude angle expressed in the moving body coordinate system, respectively. That is, two steps of coordinate transformation into inertial navigation operation results are performed using two kinds of coordinate transformation matrices.

An inertial navigation operation error is estimated by performing an error estimation operation using a Kalman filter for the state vector "X", which has been coordinate-transformed to the moving body coordinate system, by applying the observation vector at the time of movement "$Z_{move}$" defined in the moving body coordinate system. Then, the moving body coordinate position, the moving body coordinate velocity vector, and the moving body attitude angle are corrected using the inertial navigation operation error estimated in the moving body coordinate system. Then, final correction results are obtained by performing retransformation from the moving body coordinate system to the absolute coordinate system.

The corrected position, the corrected velocity vector, and the corrected attitude angle which are output from the correction section 90 are fed back to the first inertial navigation system 4A. In the first inertial navigation system 4A, the absolute coordinate position, the absolute coordinate velocity vector, and the absolute attitude angle calculated by the absolute coordinate position calculation section 50, the absolute coordinate velocity vector calculation section 40, and the absolute attitude determination section 15 are corrected using the corrected position, the corrected velocity vector, and the corrected attitude angle input from the correction section 90, respectively.

(2) Second Position Calculation Method

Figure 6:
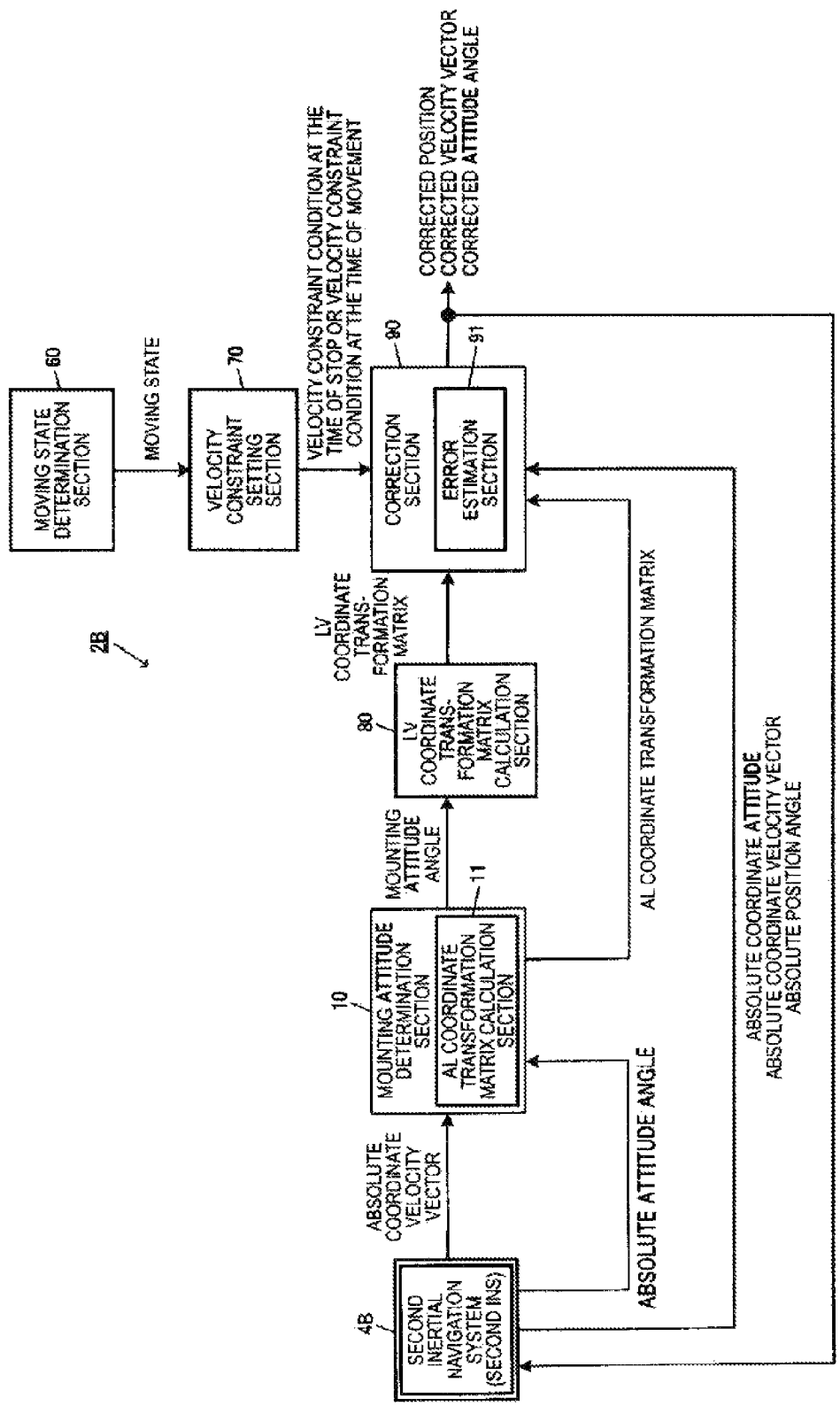
FIG. 6 is a system configuration view of a second position calculation system.

FIG. 6 is a system configuration view of a second position calculation system 2B (second position calculation device) related to a second position calculation method. The second position calculation system 2B has a second inertial navigation system (second INS) 4B, a mounting attitude determination section 10, a moving state determination section 60, a velocity constraint setting section 70, an LV coordinate transformation matrix calculation section 80, and a correction section 90, for example.

Figure 7:
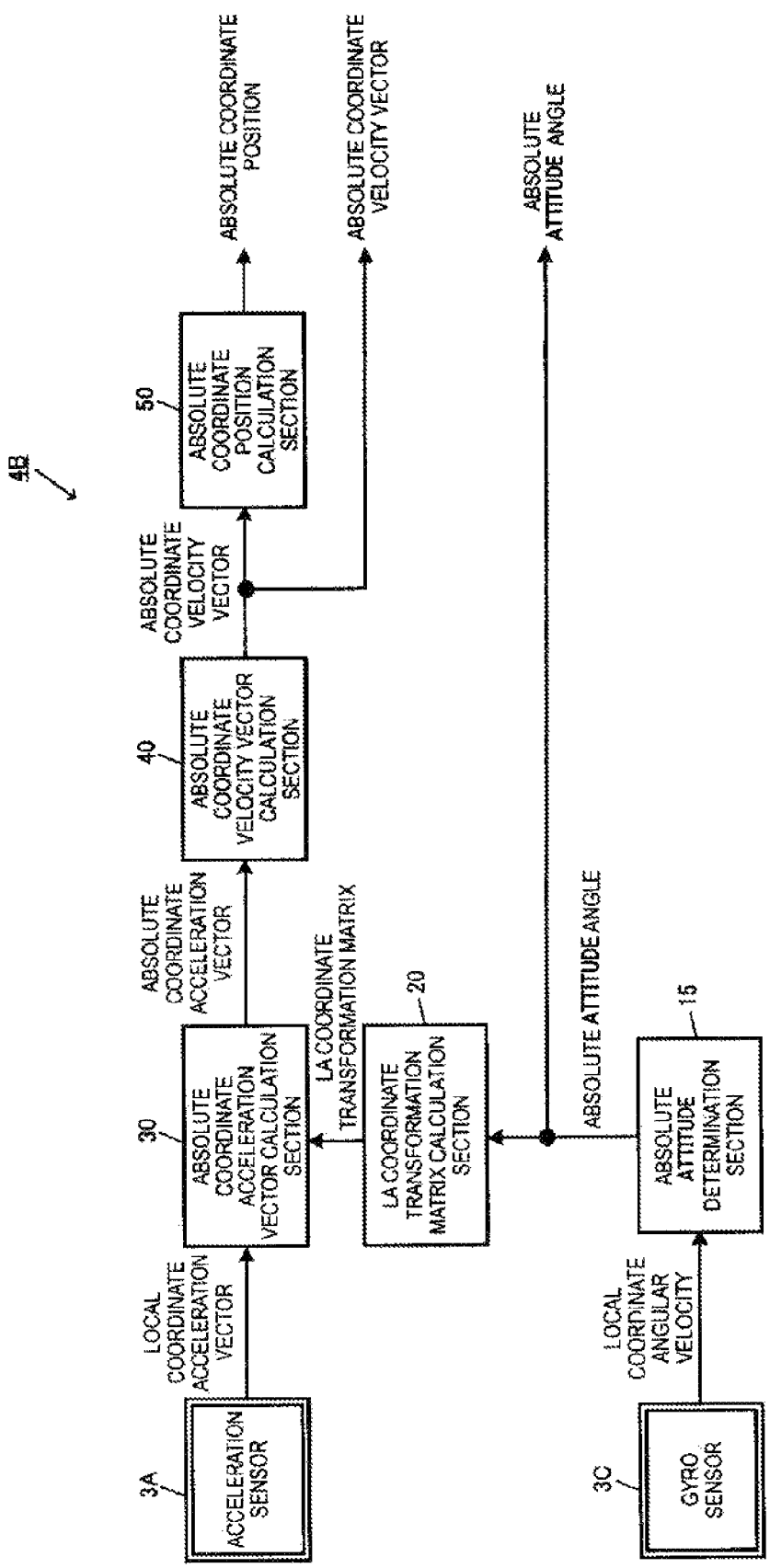
FIG. 7 is a system configuration view of a second inertial navigation system.

FIG. 7 is a view showing an example of the system configuration of the second inertial navigation system 4B. The second inertial navigation system 4B has an acceleration sensor 3A, a gyro sensor 3C, an absolute attitude determination section 15, an LA coordinate transformation matrix calculation section 20, an absolute coordinate acceleration vector calculation section 30, an absolute coordinate velocity vector calculation section 40, and an absolute coordinate position calculation section 50, for example. This configuration is a configuration excluding the local coordinate velocity vector calculation section 5 from the first inertial navigation system 4A of FIG. 5.

The absolute attitude angle calculated by the absolute attitude determination section 15, the absolute coordinate velocity vector calculated by the absolute coordinate velocity vector calculation section 40, and the absolute coordinate position calculated by the absolute coordinate position calculation section 50 are output from the second inertial navigation system 4B.

Returning to the explanation of FIG. 6, the mounting attitude determination section 10 determines the mounting attitude of the second inertial navigation system 4B with respect to the moving body using the absolute coordinate velocity vector input from the second inertial navigation system 4B. The mounting attitude determination section 10 has an AL coordinate transformation matrix calculation section 11 as a functional section and determines the mounting attitude in the same manner as in the second mounting attitude determination system 1B of FIG. 3.

The correction section 90 corrects the inertial navigation operation results input from the second inertial navigation system 4B using the mounting attitude angle and the AL coordinate transformation matrix input from the mounting attitude determination section 10, the velocity constraint condition input from the velocity constraint setting section 70, and the LV coordinate transformation matrix input from the LV coordinate transformation matrix calculation section 80. The correction section 90 has the error estimation section 91 as a functional section.

The corrected position, the corrected velocity vector, and the corrected attitude angle which are correction results of the inertial navigation operation results are output from the correction section 90. In addition, these correction results are fed back to the second inertial navigation system 4B. The second inertial navigation system 4B corrects the inertial navigation operation result using the correction results input from the correction section 90.

1-4. Simulation Result

In order to show the effectiveness of the above position calculation method, a result of a simulation experiment for calculating the position of a moving body will be described. A simulation experiment was conducted in which the sensor 3 was fixed to the moving body so as to cause installation shift and the position of the moving body was calculated using the above-described position calculation method.

Figure 8:
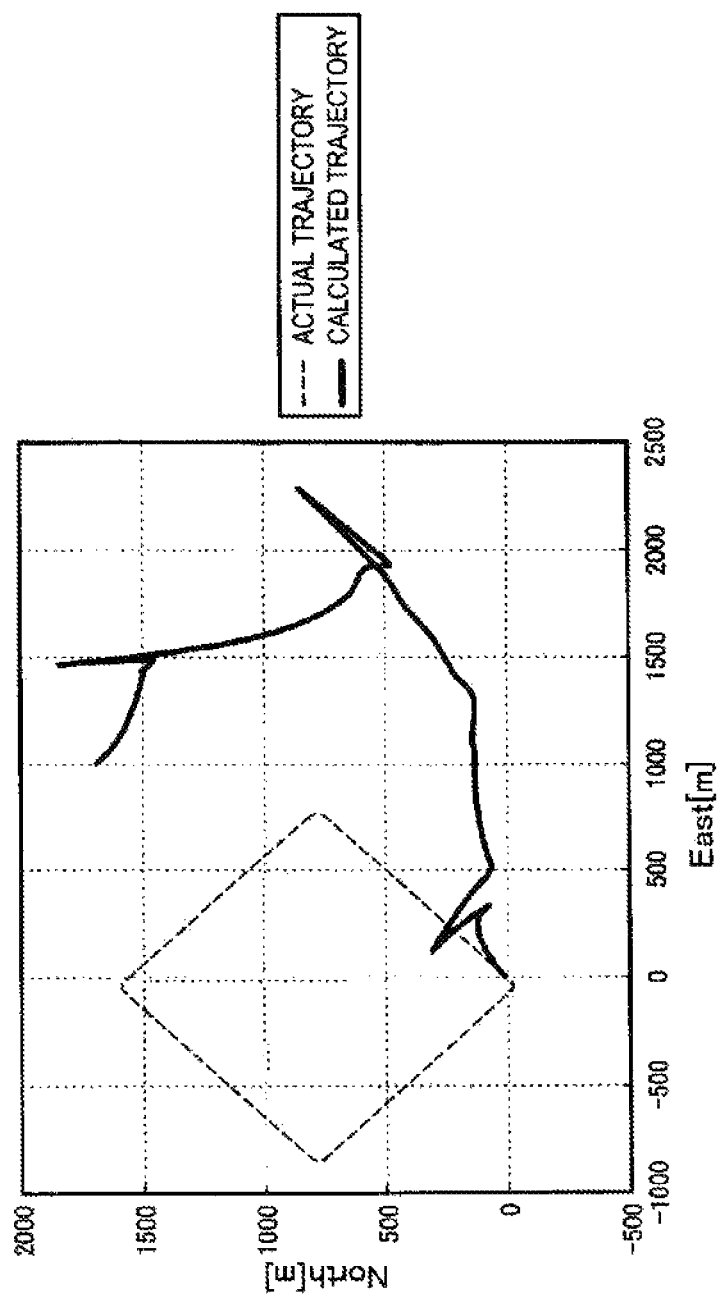
FIG. 8 is an example of a simulation result after position calculation using a known method.
Figure 9:
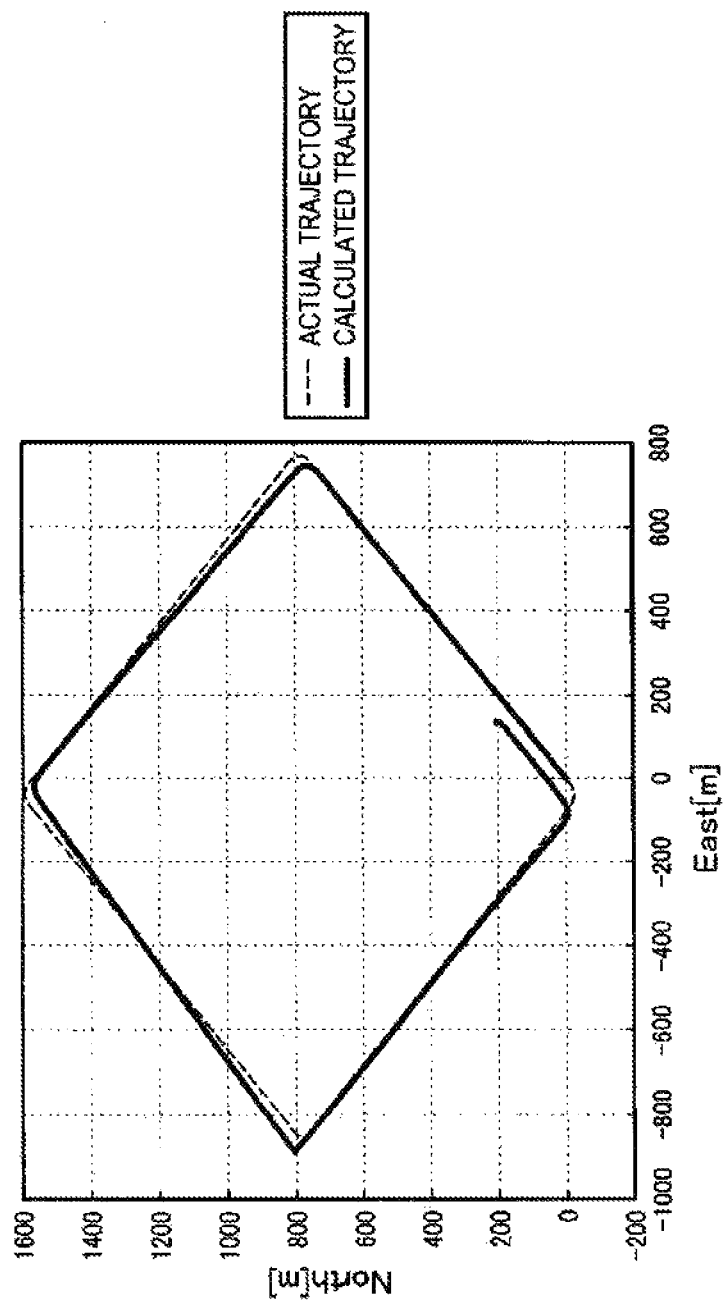
FIG. 9 is an example of a simulation result after position calculation using a method in an embodiment.

FIG. 8 shows a simulation result when a known method is used. In contrast, FIG. 9 shows a simulation result when the method of the present embodiment is used. In each drawing, the horizontal axis indicates an east-west direction, the vertical axis indicates a north-south direction, and the unit is meter [m]. A diamond-shaped path which took one round largely in the counterclockwise direction with the position of "0 m" in the east-west direction and "0 m" in the north-south direction as its start point was followed. The goal point is the same as the start point. A dotted line indicates the actual trajectory of a moving body, and a solid line indicates the trajectory of the calculated position.

Referring to FIG. 8, it can be seen that a serious position error occurs when the known method is used. That is, far from calculating the position along the diamond-shaped trajectory, it can be seen that the position deviates toward the east direction immediately after the start and eventually, the position far from the goal point is determined to be a goal point. This is because the position calculation was performed without determining the mounting attitude of the sensor 3. That is, since position calculation was performed by applying the velocity constraint condition at the time of movement (second constraint condition) defined in the moving body coordinate system although the local coordinate system and the moving body coordinate system did not match each other, the position was calculated in a wrong direction from the first and the error increases cumulatively with time.

In contrast, referring to FIG. 9, it can be seen that the almost correct trajectory along the diamond-shaped actual trajectory is obtained when the method of the present embodiment is used. This is because the position calculation could be performed by determining the mounting attitude of the sensor 3 as correctly as possible. That is, such a good result was obtained since the mounting attitude of the sensor 3 was determined and then coordinate transformation to the moving body coordinate system was performed in consideration of the amount of shift between the local coordinate system and the moving body coordinate system and position calculation was performed by applying the velocity constraint condition at the time of movement defined in the moving body coordinate system.

2. Examples

Next, an example of a navigation system to which the above attitude determination method and the above position calculation method are applied will be described. Here, it is needless to say that examples to which the present invention can be applied are not limited to the example described below.

The navigation system in this example is configured as a system in which a car navigation apparatus 1000, to which the mounting attitude determination system (attitude determination device) and the position calculation system (position calculation device) explained in the principles are applied, is mounted in a four-wheeled vehicle (hereinafter, simply referred to as an "automobile") which is a kind of moving body.

The car navigation apparatus 1000 is an electronic apparatus mounted in an automobile, and includes an IMU (Inertial Measurement Unit) 400 as a sensor module having the acceleration sensor 3A and the gyro sensor 3C. The IMU 400 is a sensor unit known as an inertial measurement unit, and is configured to be able to measure and output an acceleration vector and an angular velocity expressed in the local coordinate system.

The car navigation apparatus 1000 calculates the position of the automobile in the absolute coordinate system by performing inertial navigation operation processing using a measurement result of the IMU 400. In this example, a case where an NED coordinate system is used as the absolute coordinate system will be described. That is, the car navigation apparatus 1000 calculates the position of the automobile in the NED coordinate system. Then, the car navigation apparatus 1000 generates a navigation screen obtained by plotting the calculated position and displays the navigation screen on a display which is a display unit 300.

2-1. Functional Configuration

Figure 10:
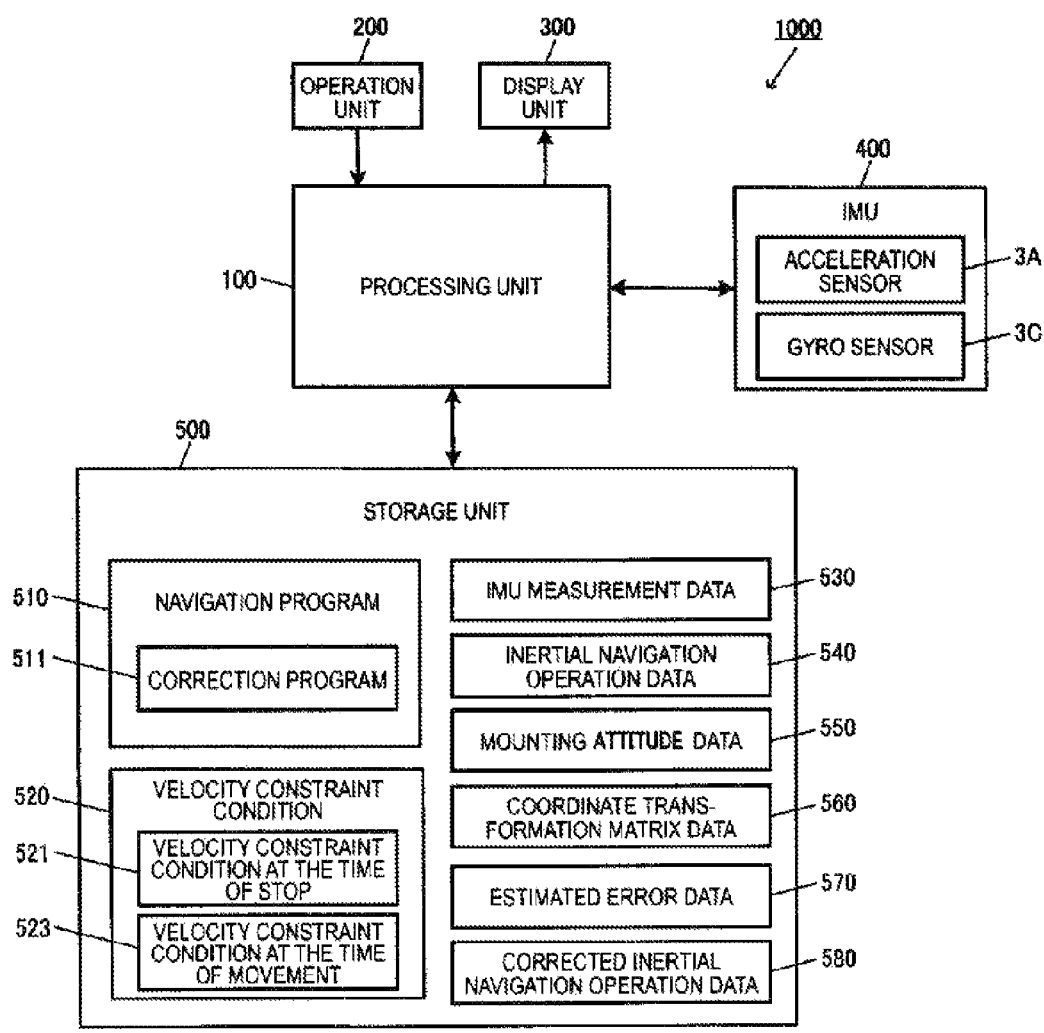
FIG. 10 is a block diagram showing the functional configuration of a car navigation apparatus.

FIG. 10 is a block diagram showing an example of the functional configuration of the car navigation apparatus 1000. The car navigation apparatus 1000 is configured to include as the main functional configuration a processing unit 100, an operation unit 200, the display unit 300, the IMU 400, and a storage unit 500.

The processing unit 100 is a controller which performs overall control of the units of the car navigation apparatus 1000 according to various kinds of programs, such as a system program, stored in the storage unit 500, and includes a processor, such as a CPU (Central Processing Unit). The processing unit 100 calculates the position and the like of the automobile by performing inertial navigation operation processing using the measurement result of the IMU 400. The processing unit 100 functions as an attitude determination device which determines the attitude of the IMU 400 with respect to the automobile and also functions as a position calculation device which calculates the position of the automobile.

Figure 11:
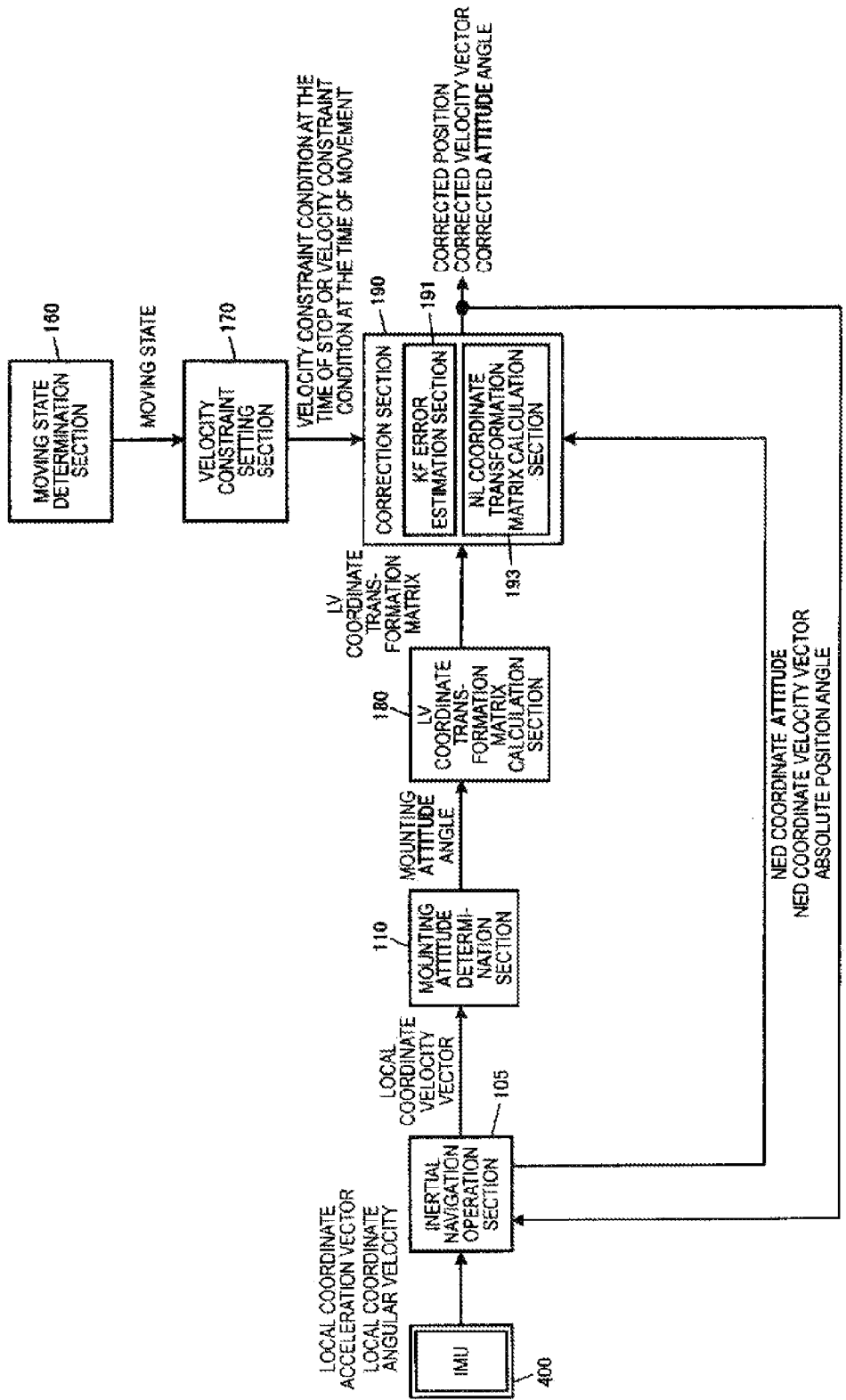
FIG. 11 is a conceptual view showing a processing unit as a functional block.

FIG. 11 is a block diagram mainly showing a functional block related to the processing unit 100. The processing unit 100 has as functional sections an inertial navigation operation section 105, a mounting attitude determination section 110, a moving state determination section 160, a velocity constraint setting section 170, an LV coordinate transformation matrix calculation section 180, and a correction section 190.

The inertial navigation operation section 105 calculates an NED coordinate position, an NED coordinate velocity vector, and an absolute attitude angle of an automobile by performing inertial navigation operation processing using the local coordinate acceleration vector and the local coordinate angular velocity input from the IMU 400.

The correction section 190 corrects the NED coordinate position, the NED coordinate velocity vector, and the absolute attitude angle input from the inertial navigation operation section 105 using the mounting attitude angle of the IMU 400 input from the mounting attitude determination section 110 and the velocity constraint condition input from the velocity constraint setting section 170. The correction section 190 has a KF error estimation section 191 and an NL coordinate transformation matrix calculation section 193 as a functional section.

The KF error estimation section 191 estimates an inertial navigation operation error included in the inertial navigation operation result in the NED coordinate system using a Kalman filter.

The NL coordinate transformation matrix calculation section 193 calculates a coordinate transformation matrix from the NED coordinate system to the local coordinate system (hereinafter, referred to as an "NL coordinate transformation matrix") using the absolute attitude angle input from the inertial navigation operation section 105.

Returning to the explanation of FIG. 10, the operation unit 200 is an input device configured to include a touch panel or a button switch, for example, and outputs a signal of a pressed key or button to the processing unit 100. By the operation of the operation unit 200, various kinds of instruction input, such as input of a destination, are performed.

The display unit 300 is formed by an LCD (Liquid Crystal Display) or the like, and is a display device which performs various kinds of display on the basis of a display signal input from the processing unit 100. A navigation screen or the like is displayed on the display unit 300.

The IMU 400 is a sensor unit known as an inertial measurement unit, and is configured to include the acceleration sensor 3A and the gyro sensor 3C, for example.

The storage unit 500 is formed by storage devices, such as a ROM (Read Only Memory) or a flash ROM and a RAM (Random Access Memory), and stores a system program of the car navigation device 1000, various programs or data used to realize various functions involving a navigation function, and the like. In addition, the storage unit 500 has a work area where data being processed, a processing result, and the like in various kinds of processing are temporarily stored.

2-2. Data Configuration

As shown in FIG. 10, a navigation program 510 which is read by the processing unit 100 and executed as navigation processing (refer to FIG. 12) is stored as a program in the storage unit 500. The navigation program 510 includes a correction program 511, which is executed as correction processing (refer to FIG. 13), as a subroutine. Details of this processing will be described later using a flow chart.

In addition, a velocity constraint condition 520, IMU measurement data 530, inertial navigation operation data 540, mounting attitude data 550, coordinate transformation matrix data 560, estimated error data 570, and corrected inertial navigation operation data 580 are stored as data in the storage unit 500.

The velocity constraint condition 520 is a constraint condition of a velocity according to the moving state of an automobile, and a velocity constraint condition at the time of stop 521 and a velocity constraint condition at the time of movement 523 are included in the velocity constraint condition 520.

The IMU measurement data 530 is data of a measurement result of the IMU 400. A local coordinate acceleration vector measured by the acceleration sensor 3A and a local coordinate angular velocity measured by the gyro sensor 3C are stored in time series.

The inertial navigation operation data 540 is data of the NED coordinate position, the NED coordinate velocity vector, and the absolute attitude angle calculated when the processing unit 100 performs inertial navigation operation processing using the measurement result of the IMU 400.

The mounting attitude data 550 is data in which the mounting attitude angle of the IMU 400 calculated by the processing unit 100 is stored. The coordinate transformation matrix data 560 is data in which various kinds of coordinate transformation matrices calculated by the processing unit 100 are stored.

The estimated error data 570 is data in which an inertial navigation operation error estimated by performing a KF error estimation operation by the processing unit 100 is stored. In addition, the corrected inertial navigation operation data 580 is data obtained when the processing unit 100 corrects an inertial navigation operation result using the inertial navigation operation error.

2-3. Flow of Processing

Figure 12:
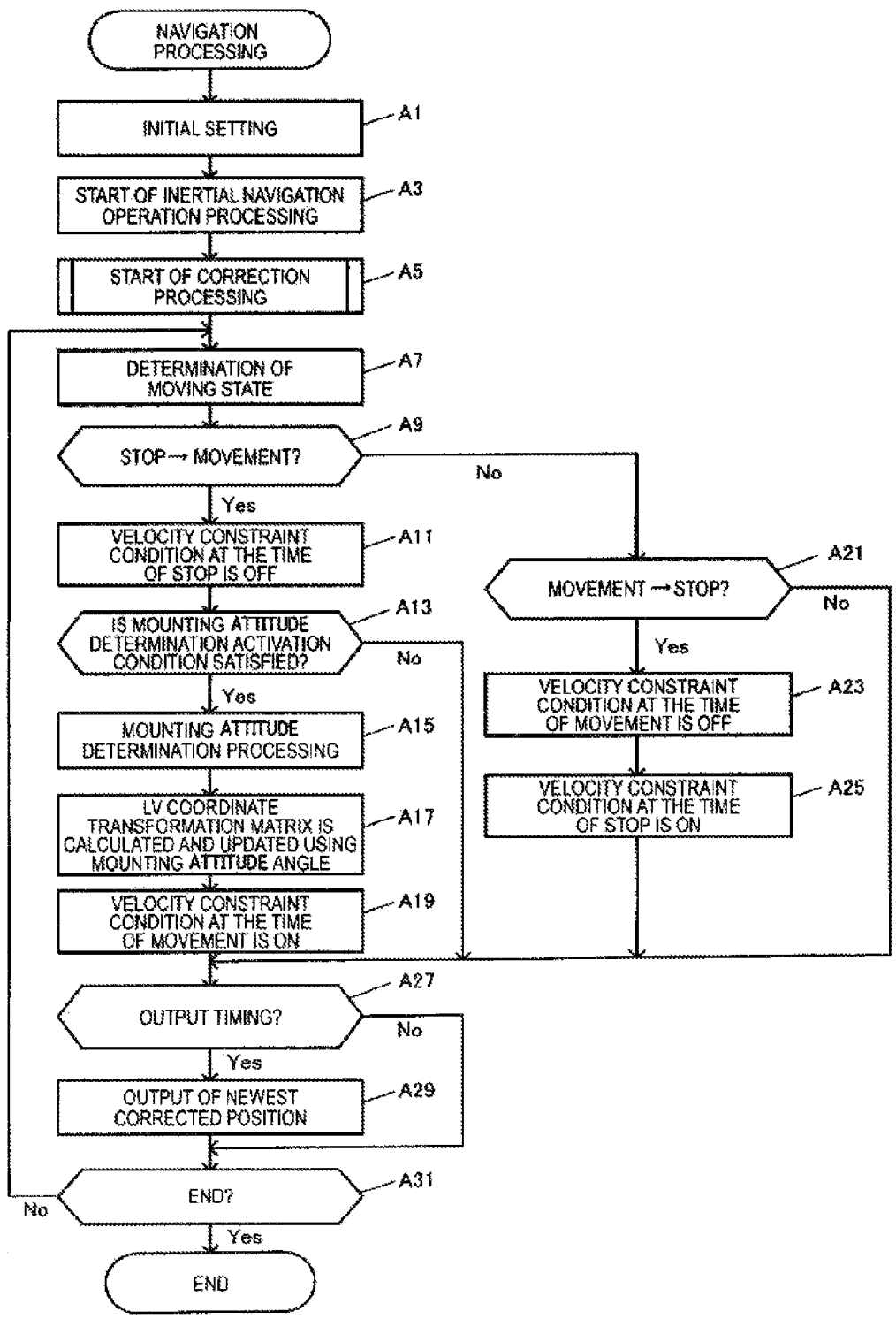
FIG. 12 is a flow chart showing the flow of navigation processing.

FIG. 12 is a flow chart showing the flow of navigation processing which is executed in the car navigation apparatus 1000 when the navigation program 510 stored in the storage unit 500 is read and executed by the processing unit 100. In the following navigation processing, the local coordinate acceleration vector and the local coordinate angular velocity measured by the IMU 400 are stored in the IMU measurement data 530 of the storage unit 500 when necessary.

First, the processing unit 100 performs initial setting (step A1). For example, the processing unit 100 performs initial setting of various parameter values used in a Kalman filter. In addition, the processing unit 100 assumes that an automobile is in a stop state and sets the velocity constraint condition at the time of stop 521 to "ON" and the velocity constraint condition at the time of movement 523 to "OFF".

Then, the inertial navigation operation section 105 starts inertial navigation operation processing (step A3). That is, the inertial navigation operation section 105 performs inertial navigation operation processing using the measurement data of the IMU 400 stored in the IMU measurement data 530. Then, the result is stored in the storage unit 500 as the inertial navigation operation data 540.

Then, the correction section 190 starts correction processing according to the correction program 511 stored in the storage unit 500 (step A5).

Figure 13:
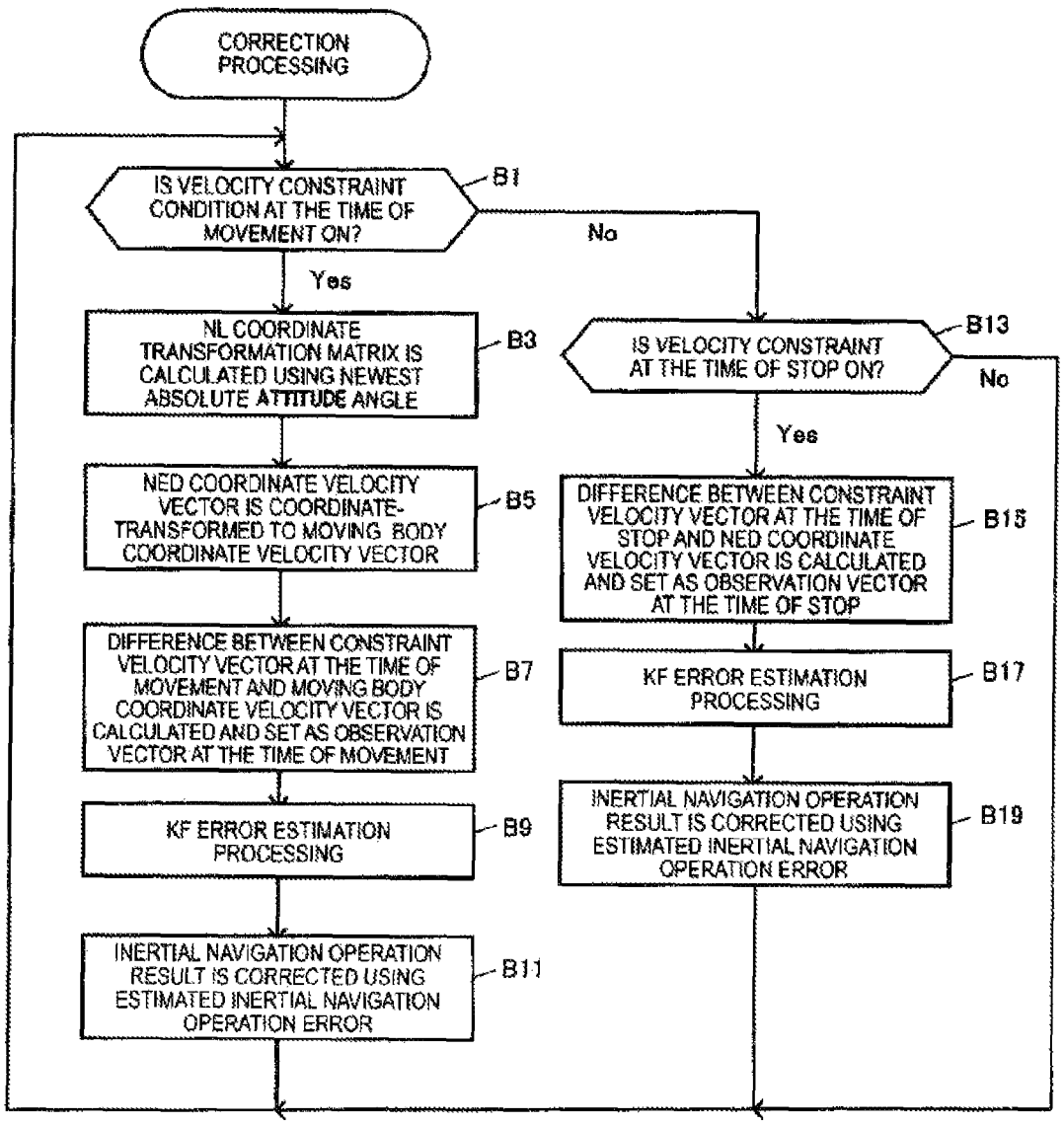
FIG. 13 is a flow chart showing the flow of correction processing.

FIG. 13 is a flow chart showing the flow of correction processing.

First, the KF error estimation section 191 determines whether or not the velocity constraint condition at the time of movement 523 is set to "ON" (step B1). Then, when it is determined that the velocity constraint condition at the time of movement 523 is set to "ON" (step B1; Yes), the NL coordinate transformation matrix calculation section 193 calculates an NL coordinate transformation matrix using the newest absolute attitude angle and stores the calculated NL coordinate transformation matrix in the coordinate transformation matrix data 560 of the storage unit 500 (step B3).

Then, the KF error estimation section 191 converts the NED coordinate velocity vector into a moving body coordinate velocity vector using the NL coordinate transformation matrix calculated in step B3 (step B5). Then, the KF error estimation section 191 calculates a difference between a constraint velocity vector at the time of movement and a moving body coordinate velocity vector and sets this as an observation vector at the time of movement (step B7).

Then, the KF error estimation section 191 performs KF error estimation processing (step B9). That is, the KF error estimation section 191 estimates an inertial navigation operation error by performing a prediction operation and a correction operation using as observation information the observation vector at the time of movement set in step B7. Then, the KF error estimation section 191 corrects the inertial navigation operation result using the estimated inertial navigation operation error and stores the result in the corrected inertial navigation operation data 580 of the storage unit 500 (step B11), and then the process returns to step B1.

In addition, when it is determined that the velocity constraint condition at the time of movement 523 is not set to "ON" in step B1 (step B1; No), the KF error estimation section 191 determines whether or not the velocity constraint condition at the time of stop 521 is set to "ON" (step B13). Then, when it is determined that the velocity constraint condition at the time of movement 523 is set to "ON" (step B13; Yes), the KF error estimation section 191 calculates a difference between the constraint velocity vector at the time of stop and the NED coordinate velocity vector and sets this as an observation vector at the time of stop (step B15).

Then, the KF error estimation section 191 performs KF error estimation processing (step B17). That is, the KF error estimation section 191 estimates an inertial navigation operation error by performing a prediction operation and a correction operation using as observation information the observation vector at the time of stop set in step B15. Then, the KF error estimation section 191 corrects the inertial navigation operation result using the estimated inertial navigation operation error and stores the result in the corrected inertial navigation operation data 580 of the storage unit 500 (step B19), and then the process returns to step B1.

In addition, when it is determined that the velocity constraint condition at the time of stop 521 is not set to "ON" in step B13 (step B13; No), the correction section 190 returns to step B1.

Returning to the explanation of FIG. 12, when correction processing starts in step A5, the moving state determination section 160 determines a moving state of the automobile (step A7). Then, the processing unit 100 determines whether or not the automobile has started to move from the stop state (step A9). For example, the processing unit 100 determines the start of movement of the automobile by receiving a release signal of brake control of the automobile from the outside or receiving the vehicle speed information from the outside.

When it is determined that the automobile has started to move (step A9; Yes), the velocity constraint setting section 170 sets the velocity constraint condition at the time of stop 521 to "OFF" (step A11). Then, the processing unit 100 determines whether or not a predetermined mounting attitude determination activation condition is satisfied (step A13). As also described in the principles, the mounting attitude determination activation condition is a condition set in order to ensure the determination accuracy of the mounting attitude. For example, a condition "velocity or acceleration of a moving body reaches a predetermined threshold value after the stop of the moving body is released" is preferably set as the activation condition.

When it is determined that the mounting attitude determination activation condition is not yet satisfied in step A13 (step A13; No), the processing unit 100 proceeds to step A27. When it is determined that the mounting attitude determination activation condition is satisfied (step A13; Yes), the mounting attitude determination section 110 performs mounting attitude determination processing (step A15). That is, using the newest local coordinate velocity vector, a mounting attitude angle is calculated according to Expressions (2) and (3) and the mounting attitude data 550 of the storage unit 500 is updated.

Then, the processing unit 100 calculates an LV coordinate transformation matrix using the mounting attitude angle calculated in step A15 and updates the coordinate transformation matrix data 560 of the storage unit 500 (step A17). Then, the processing unit 100 sets the velocity constraint condition at the time of movement 523 to "ON" (step A19).

On the other hand, when the start of movement of the automobile is not detected in step A9 (step A9; No), the processing unit 100 determines whether or not the automobile has changed from the movement state to the stop state (step A21). When it is determined that the automobile has not changed to the stop state (step A21; No), the processing unit 100 proceeds to step A27.

In addition, when it is determined that the automobile has changed from the movement state to the stop state (step A21; Yes), the processing unit 100 sets the velocity constraint condition at the time of movement 523 to "OFF" (step A23) and also sets the velocity constraint condition at the time of stop 521 to "ON" (step A25). Then, the processing unit 100 proceeds to step A27.

The processing unit 100 determines whether or not this is a position output timing (step A27). When it is determined that this is not a position output timing (step A27; No), the process proceeds to step A31. In addition, when it is determined that this is a position output timing (step A27; Yes), the processing unit 100 outputs the newest corrected position (step A29). That is, the processing unit 100 updates the navigation screen of the display unit 300 by performing map matching processing or the like on the newest corrected position.

Then, the processing unit 100 determines whether to end the navigation processing (step A31). For example, when the user gives an instruction to end the navigation through the operation unit 200, it is determined that the navigation processing is to be ended. Then, when it is determined that the processing is not yet to be ended (step A31; No), the processing unit 100 returns to step A7. In addition, when it is determined that the processing is to be ended (step A31; Yes), the processing unit 100 ends the navigation processing.

2-4. Experimental Results

An experiment to calculate the position by mounting the car navigation apparatus 1000 in an automobile and making the automobile actually travel was performed. Specifically, an experiment to calculate the above navigation position and plot the position was performed.

Figure 14:
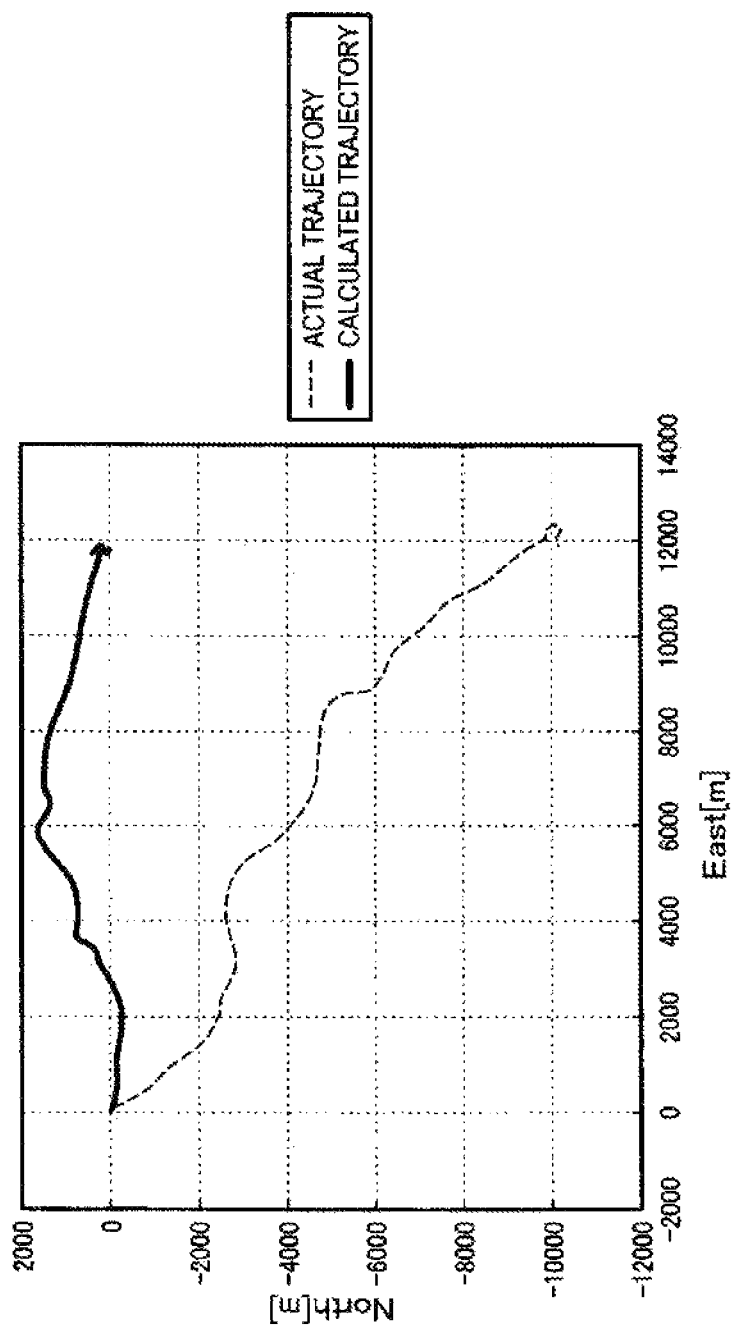
FIG. 14 is an example of an experimental result of position calculation using known navigation processing.
Figure 15:
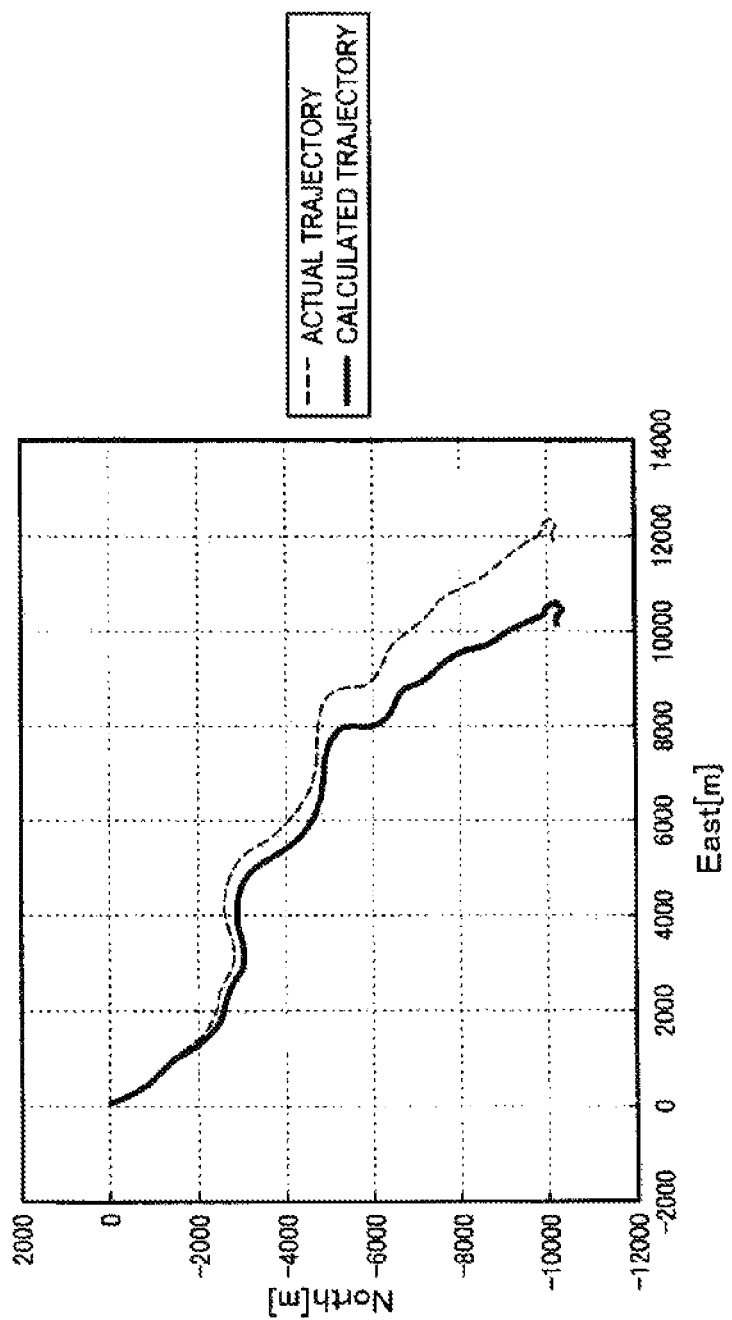
FIG. 15 is an example of an experimental result of position calculation using the navigation processing in the embodiment.

FIG. 14 shows an experimental result when the known car navigation apparatus 1000 is used. In contrast, FIG. 15 shows an experimental result when the car navigation apparatus 1000 in this example is used. In both the cases, the map matching function is set to OFF. Although the view on the drawings is the same as the simulation results in FIGS. 8 and 9, the paths are different since the experimental results in FIGS. 14 and 15 are results obtained by actually performing traveling experiments. An automobile was made to actually travel from the start point to the goal point in a state where the position of "0 m" in the east-west direction and "0 m" in the north-south direction was set as its start point and the position near "12000 m" in the east direction and "10000 m" in the south direction was set as its goal position.

This result shows that the position is calculated in a wrong direction immediately after the start and a position far from the goal point is eventually determined as the goal point in the experimental result of the known car navigation apparatus 1000 in FIG. 14, as in the simulation result of FIG. 8. In contrast, from the experimental result of the car navigation apparatus 1000 in this example of FIG. 15, it can be seen that the correct trajectory along the almost actual trajectory is obtained as in the simulation result of FIG. 9. Therefore, it was clear that the position calculation method of the present embodiment was also effective in the real environment.

3. Operations and Effects

According to the present embodiment, a movement vector is measured by the sensor 3 mounted in the moving body. Then, the attitude of the sensor 3 with respect to the moving body is determined using a movement vector measured by the sensor 3 when the moving body starts to move.

In the first mounting attitude determination system 1A, the local coordinate velocity vector calculation section 5 calculates a local coordinate velocity vector using a local coordinate acceleration vector measured by the acceleration sensor 3A. Then, the mounting attitude determination section 10 determines a pitch component and a yaw component of the mounting attitude of the acceleration sensor 3A using a local coordinate velocity vector when the moving body starts to move.

In addition, in the second mounting attitude determination system 1B, the LA coordinate transformation matrix calculation section 20 calculates a coordinate transformation matrix from the local coordinate system to the absolute coordinate system (LA coordinate transformation matrix) using a direction (absolute attitude) of the sensor 3 expressed in the absolute coordinate system which is measured by the attitude sensor 3B. Then, the absolute coordinate acceleration vector calculation section 30 performs coordinate transformation of the local coordinate acceleration vector, which has been measured by the acceleration sensor 3A, to an absolute coordinate acceleration vector using the LA coordinate transformation matrix. In addition, the absolute coordinate velocity vector calculation section 40 calculates an absolute coordinate velocity vector using the absolute coordinate acceleration vector. The mounting attitude determination section 10 calculates a coordinate transformation matrix from the absolute coordinate system to the local coordinate system (AL coordinate transformation matrix) using the direction of the sensor 3 expressed in the absolute coordinate system, which has been measured by the attitude sensor 3B, and determines a pitch component and a yaw component of the mounting attitude of the acceleration sensor 3A using the AL coordinate transformation matrix and the absolute coordinate velocity vector.

In addition, when the moving body is in a stop state, a compensation operation for compensating for a measurement result of the sensor 3 is performed. For example, when the moving body is in a stop state, a measurement result of the sensor 3 is compensated for using a constraint condition in which each component of a velocity vector of the moving body is 0 (first constraint condition). As a result, an error included in the measurement result of the sensor 3 can be reduced when the moving body is in a stop state. Even if the moving body starts to move in a state where an error is reduced, an error of the velocity vector of the moving body is suppressed if time has not elapsed that much. Therefore, the relative attitude of the sensor 3 with respect to the moving body can be correctly determined by using the velocity vector when the moving body starts to move.

In addition, in the first position calculation system 2A, the inertial navigation operation results (the absolute coordinate position, the absolute coordinate velocity vector, and the absolute attitude angle) of the first inertial navigation system 4A are corrected by the correction section 90. The correction section 90 estimates an inertial navigation operation error by performing a predetermined error estimation operation using the mounting attitude of the first inertial navigation system 4A determined by the mounting attitude determination section 10, the velocity constraint condition at the time of stop (first constraint condition) or the velocity constraint condition at the time of movement (second constraint condition) set by the velocity constraint setting section 70, and the LV coordinate transformation matrix calculated by the LV coordinate transformation matrix calculation section 80. Then, the inertial navigation operation result is corrected using the estimated inertial navigation operation error. In addition, also in the second position calculation system 2B, the inertial navigation operation results (the absolute coordinate position, the absolute coordinate velocity vector, and the absolute attitude angle) of the second inertial navigation system 4B are similarly corrected by the correction section 90.

Thus, by appropriately performing coordinate transformation between the two kinds of coordinate systems in consideration of the amount of shift between the local coordinate system and the moving body coordinate system using the mounting attitude of the sensor 3 determined using the first or second mounting attitude determination method and the movement vector (the acceleration vector or the velocity vector) measured by the sensor 3, the position of the moving body can be calculated more accurately.

4. Modifications

Undoubtedly, examples to which the present invention can be applied are not limited to the above-described examples, and various modifications may be made without departing from the spirit and scope of the present invention. Hereinafter, modifications will be described, and the same components as in the above example are denoted by the same reference numerals and explanation thereof will be omitted. The following explanation will be focused on different parts from the above examples.

4-1. Travel Direction Switching Correspondence Logic

In the above embodiment, calculating the position using the LV coordinate transformation matrix calculated when a moving body starts to move has been described. However, the moving body does not necessarily move only forward in the movement direction. For example, if the moving body is a four-wheeled vehicle, the four-wheeled vehicle may move backward without being limited to moving forward.

Accordingly, performing calculation using the same LV coordinate transformation matrix before and after the movement direction change when the movement direction of a moving body switches between forward movement and backward movement is based on the assumption that the velocity or the position of the moving body is not appropriately calculated in that case. This is because the mounting attitude of the sensor 3 is determined using a movement vector with respect to the movement direction of the moving body when the moving body starts to move in the method of the present embodiment and accordingly, coherence between the mounting attitude and the movement direction is not satisfied if the movement direction of the moving body is reversed.

In view of the above-described problem, it is preferable to apply the following movement direction switching correspondence logic. Specifically, it is determined whether or not the movement direction of a moving body has been reversed on the basis of a velocity vector of the moving body in the moving body coordinate system, for example. Then, when the movement direction of the moving body is reversed, an LV coordinate transformation matrix stored after being calculated at the start of movement is updated by rotation of 180° and calculation is performed using the updated LV coordinate transformation matrix.

Figure 16:
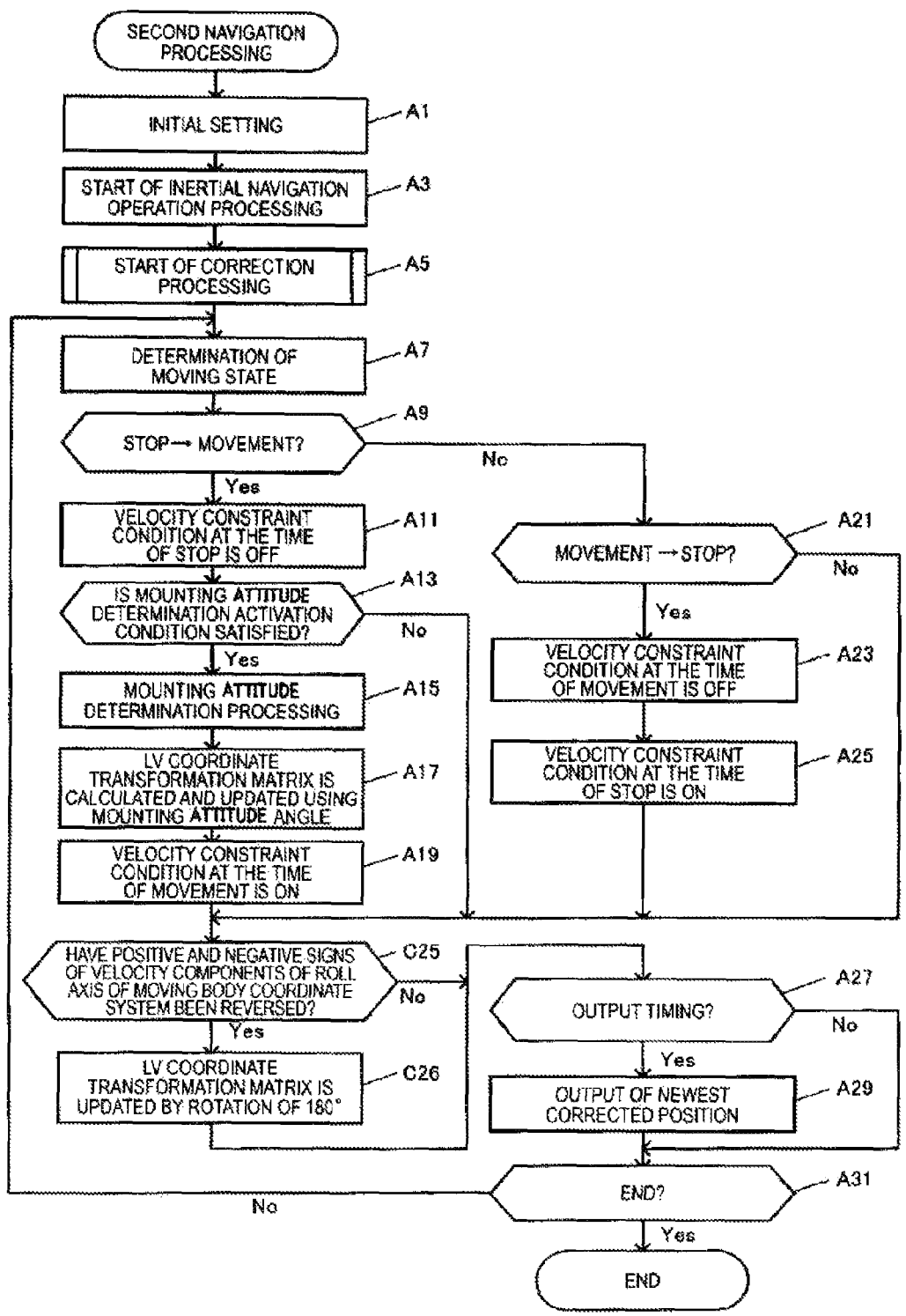
FIG. 16 is a flow chart showing the flow of second navigation processing.

FIG. 16 is a flow chart showing the flow of second navigation processing executed by the car navigation apparatus 1000 of the example instead of the navigation processing in FIG. 12.

In the second navigation processing, the processing unit 100 determines whether or not positive and negative signs of velocity components of the roll axis (R axis) of the moving body coordinate system have been reversed after step A19 or step A25 (step C25). When the signs have not been reversed (step C25; No), the processing unit 100 determines that the movement direction of an automobile has not changed and proceeds to step A27.

On the other hand, when the positive and negative signs have been reversed (step C25; Yes), the processing unit 100 determines that the movement direction of the automobile has changed and updates the coordinate transformation matrix data 560 by rotating the newest LV coordinate transformation matrix, which is stored in the coordinate transformation matrix data 560, by 180° (step C26). Then, the processing unit 100 proceeds to step A27.

Figure 17:
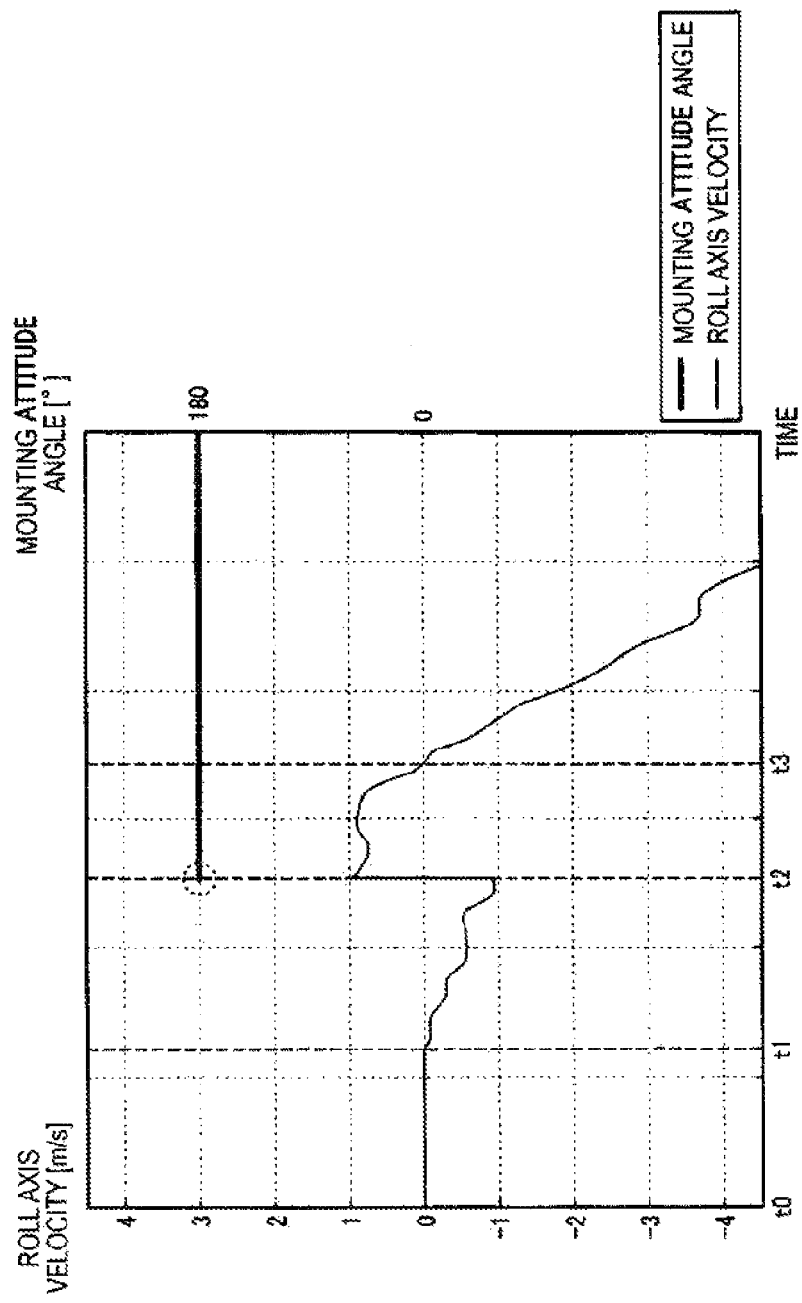
FIG. 17 is an example of an experimental result when the movement direction switching correspondence logic is not applied.
Figure 18:
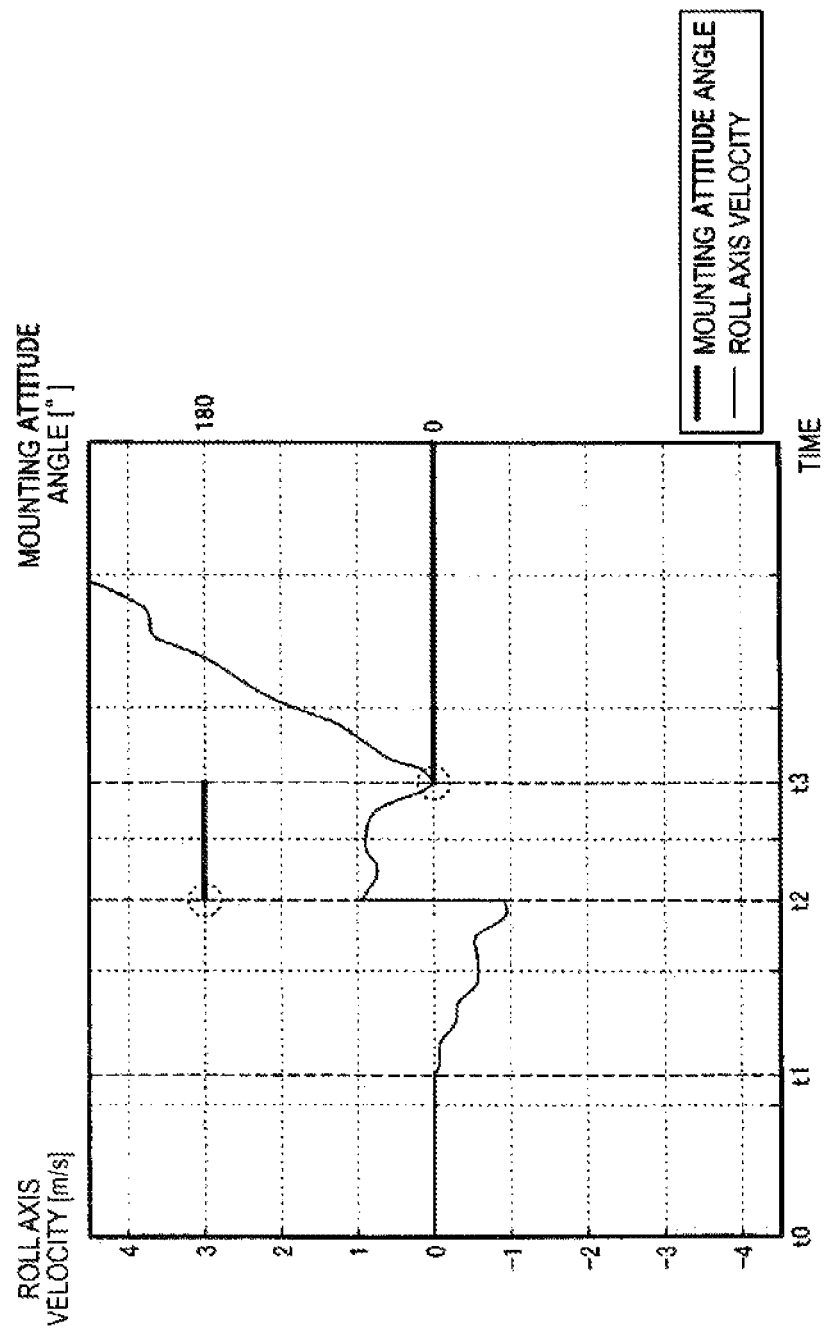
FIG. 18 is an example of an experimental result when the movement direction switching correspondence logic is applied.

FIGS. 17 and 18 are experimental results showing the effectiveness of the above-described movement direction switching correspondence logic. FIG. 17 is an experimental result when the movement direction switching correspondence logic is not applied. In contrast, FIG. 18 is an experimental result when the movement direction switching correspondence logic is applied. The sensor 3 was mounted such that the front of a movement direction (forward direction) of an automobile and the x-axis positive direction of the sensor 3 matched each other. That is, the mounting attitude angle of the sensor 3 in this case is "0°".

The automobile was in a stop state during a period from time "t0" to "t1". Then, the automobile started to move backward at time "t1", and the automobile stopped for the moment at time "t2" and moved forward. In each drawing, the horizontal axis indicates a time axis, and the vertical axis indicates a roll axis velocity (unit is [m/s]) of an automobile and a mounting attitude angle (unit is [°]) of the sensor 3. In addition, a thick solid line indicates a determined mounting attitude angle of the sensor 3, and a thin solid line indicates a calculated roll axis velocity of an automobile.

Referring to these drawings, the roll axis velocity is 0 from time "t0" to "t1". Then, when the automobile starts to move backward at time "t1", the roll axis velocity becomes a negative value and decreases gradually until time "t2".

Then, when the absolute value of the roll axis velocity exceeds a predetermined threshold value at time "t2", the mounting attitude determination activation condition is satisfied (step A13 in FIG. 16; Yes). Accordingly, the mounting attitude of the sensor 3 is determined (step A15 in FIG. 16). In this case, since the mounting attitude determination section 10 determines the mounting attitude by recognizing the backward movement direction of the automobile as a movement direction of the automobile, the mounting attitude determination section 10 determines the mounting attitude to be "180°" although the actual mounting attitude angle of the sensor 3 is "0°".

In this case, the LV coordinate transformation matrix is calculated using the mounting attitude angle of "180°" (step A17 in FIG. 16) and calculation using the LV coordinate transformation matrix is performed. For this reason, the roll axis velocity of the automobile is calculated as a positive value. Since the automobile moves backward, the actual roll axis velocity is a negative value.

When the movement direction switching correspondence logic is not applied, the sign of the roll axis velocity is not changed as shown in FIG. 17 since calculation is performed in a state where the mounting attitude angle of the sensor 3 is recognized to be "180°" even if the automobile starts to move forward at time "t3". Accordingly, the roll axis velocity which is to be calculated as a positive value is calculated as a negative value, and the roll axis velocity increases in the negative direction as the automobile accelerates forward.

In contrast, a case when the movement direction switching correspondence logic is applied is as shown in FIG. 18. When the start of forward movement of an automobile at time "t3" is detected (step C25 in FIG. 16; Yes), the LV coordinate transformation matrix calculated by setting the mounting attitude angle to "180°" is inverted to be updated (step C26 in FIG. 16). Then, calculation is performed using the inverted LV coordinate transformation matrix. Accordingly, the sign of the calculated roll axis velocity changes from negative to positive. Then, as the automobile accelerates forward, the roll axis velocity increases in the positive direction. Thus, it is possible to respond to changes in the movement direction of a moving body appropriately by applying the movement direction switching correspondence logic.

4-2. Correction Method of a Correction Section

In the above embodiment, the Kalman filter has been described as an example of a method of correcting an inertial navigation operation result, the correction method is not limited to this. For example, a velocity vector may be corrected by performing averaging processing of a constraint velocity vector, which is included in the velocity constraint condition set by the velocity constraint setting section 70, and a velocity vector obtained by the inertial navigation operation.

In addition, the velocity vector obtained by the inertial navigation operation may be corrected using the speed of a moving body measured by a speed detection system and the direction of the moving body measured by an azimuth sensor, such as a magnetic sensor. For example, regarding the magnitude of a velocity vector, it is also possible to perform averaging processing of the magnitude of the velocity vector obtained by the inertial navigation operation and the speed measured by the speed detection system. In addition, regarding the direction of a velocity vector, it is also possible to perform averaging processing of the direction of the velocity vector obtained by the inertial navigation operation and the direction of the moving body measured by the azimuth sensor.

As the averaging processing, simple arithmetic averaging or geometric averaging may be applied or weighted averaging may be applied. If the inertial navigation operation result is trusted and the velocity vector is corrected, it is preferable to perform weighted averaging under the condition in which the weight of the inertial navigation operation result is set to be higher than the weight of a measurement result of a speed detection system or an azimuth sensor. On the contrary, if a measurement result of a speed detection system or an azimuth sensor is trusted and the velocity vector is corrected, it is preferable to perform weighted averaging under the condition in which the weight of the inertial navigation operation result is set to be lower than the weight of the measurement result of the speed detection system or the azimuth sensor. In addition to these methods, any method may be applied as a correction method of a correction section.

4-3. Main Component of Processing

In the example described above, the IMU 400 is mounted in an electronic apparatus, and a processing unit of the electronic apparatus performs inertial navigation operation processing on the basis of a measurement result of the IMU 400. However, it is also possible to mount an INS in an electronic apparatus and to perform inertial navigation operation processing by a processing unit of the INS. In this case, the processing unit of the electronic apparatus performs processing for estimating an error (inertial navigation operation error) included in an inertial navigation operation result output from the INS. Then, an inertial navigation operation result input from the INS is corrected using the estimated inertial navigation operation error.

In addition, it is also possible to mount a sensor unit, to which a satellite positioning system such as a GPS (Global Positioning System) is applied, in an electronic apparatus and to correct an inertial navigation operation result using a measurement result of this sensor unit.

Figure 19:
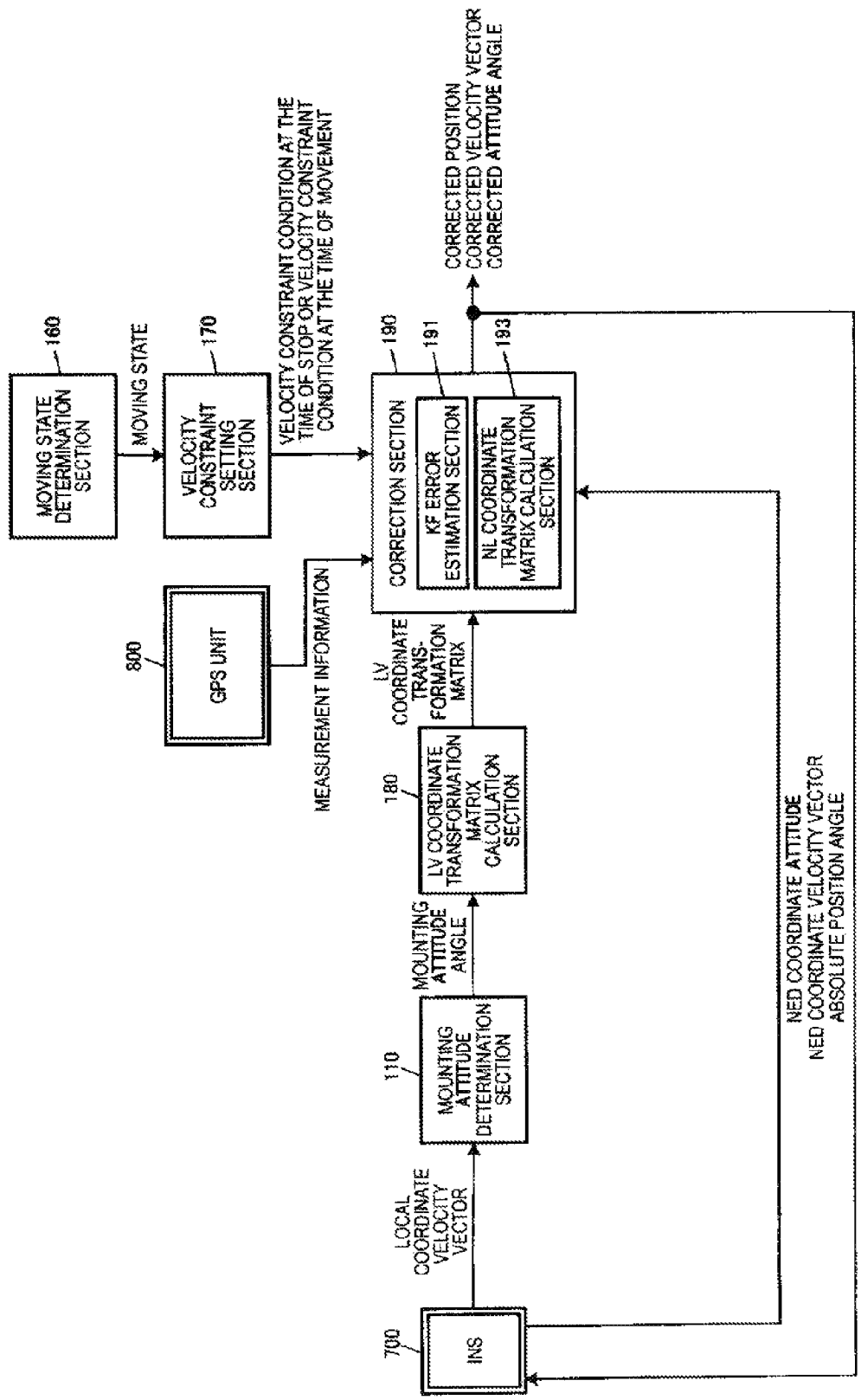
FIG. 19 is a conceptual view showing a processing unit in a modification as a functional block.

FIG. 19 is a view showing the configuration of an electronic apparatus in this case, and mainly shows a functional block related to the processing unit 100. In the electronic apparatus shown in FIG. 19, an INS 700 is mounted instead of the IMU 400 in FIG. 11, and a GPS unit 800 is further mounted. In this case, since the processing unit 100 does not perform inertial navigation operation processing, the inertial navigation operation section 105 in FIG. 11 is removed.

The mounting attitude determination section 110 determines the mounting attitude of the INS 700 using a local coordinate velocity vector input from the INS 700. The KF error estimation section 191 of the correction section 190 estimates an inertial navigation operation error, which is included in the inertial navigation operation result of the INS 700, using not only the velocity constraint condition input from the velocity constraint setting section 170 but also measurement information input from the GPS unit 800 as observation information.

The measurement information is various quantities related to a GPS satellite signal received from a GPS satellite. For example, various quantities called a carrier phase or a code phase, a Doppler frequency, a pseudo range, and a pseudo range change rate (range rate) of a GPS satellite signal are included in the measurement information. In addition, since the method of estimating an inertial navigation operation error using the measurement information of a GPS as observation information is well known, explanation using Expressions and the like will be omitted.

4-4. Attitude Determination Timing

In the above embodiment, determining the mounting attitude of the sensor 3 whenever a moving body starts to move after the moving body stops has been described. However, the attitude determination timing may be appropriately set. For example, it is also possible to determine the mounting attitude of the sensor 3 only at the first movement start timing of a moving body after the sensor 3 is mounted in the moving body. In this case, it is preferable that mounting attitude determination be not performed after the first time and processing be performed using the mounting attitude determined at the first time.

4-5. Component of Attitude Determination

In the above embodiment, determining both the pitch component and the yaw component of the mounting attitude of the sensor 3 with respect to the moving body has been described. However, only one of the pitch component and the yaw component may be determined.

4-6. Error of Installation Shift

The above embodiment is based on the assumption that the mounting attitude of the sensor 3 is not changed during movement. However, a change of the mounting attitude of the sensor 3 caused by vibration or the like during the movement, that is, installation shift may occur. Therefore, it is possible to estimate an error angle of installation shift by adding a component of an error angle caused by installation shift to the state vector of Expression (6) and to perform KF error estimation processing (step B9) using an observation vector at the time of movement calculated by the KF error estimation section 191 in a state where the velocity constraint condition at the time of movement 523 is set to "ON". In this way, even if the mounting attitude of the sensor 3 change during movement, it becomes possible to correct the mounting attitude determined in the mounting attitude determination processing of step A15 in FIG. 12 or FIG. 16 when necessary.

4-7. Modifications of Mounting Attitude Determination Processing

In the mounting attitude determination described using FIG. 3 and the like, when there is a bias error in a local coordinate acceleration vector measured by the IMU 400, a case may be considered in which attitude determination cannot be correctly performed since a bias error is also included in the calculated AL coordinate transformation matrix. Therefore, the following processing may be performed.

Figure 20:
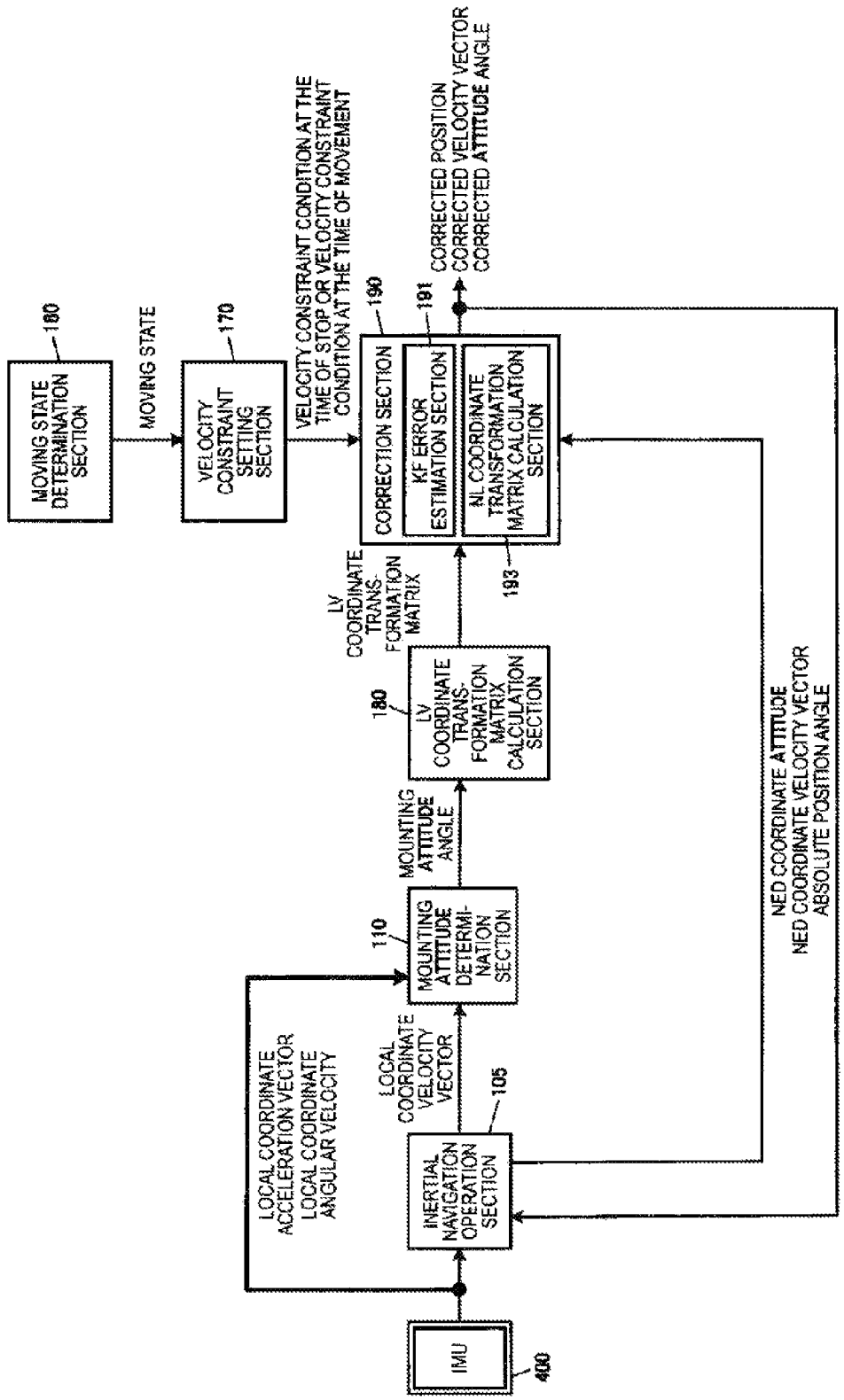
FIG. 20 is a conceptual view showing a processing unit in a modification as a functional block.

That is, as shown in FIG. 20, in the functional block of the processing unit 100 shown in FIG. 11, the local coordinate acceleration vector and the local coordinate angular velocity measured by the IMU 400 are input to the mounting attitude determination section 110. Then, the mounting attitude determination section 110 (processing unit 100) executes second mounting attitude determination processing shown in FIG. 21.

Figure 21:
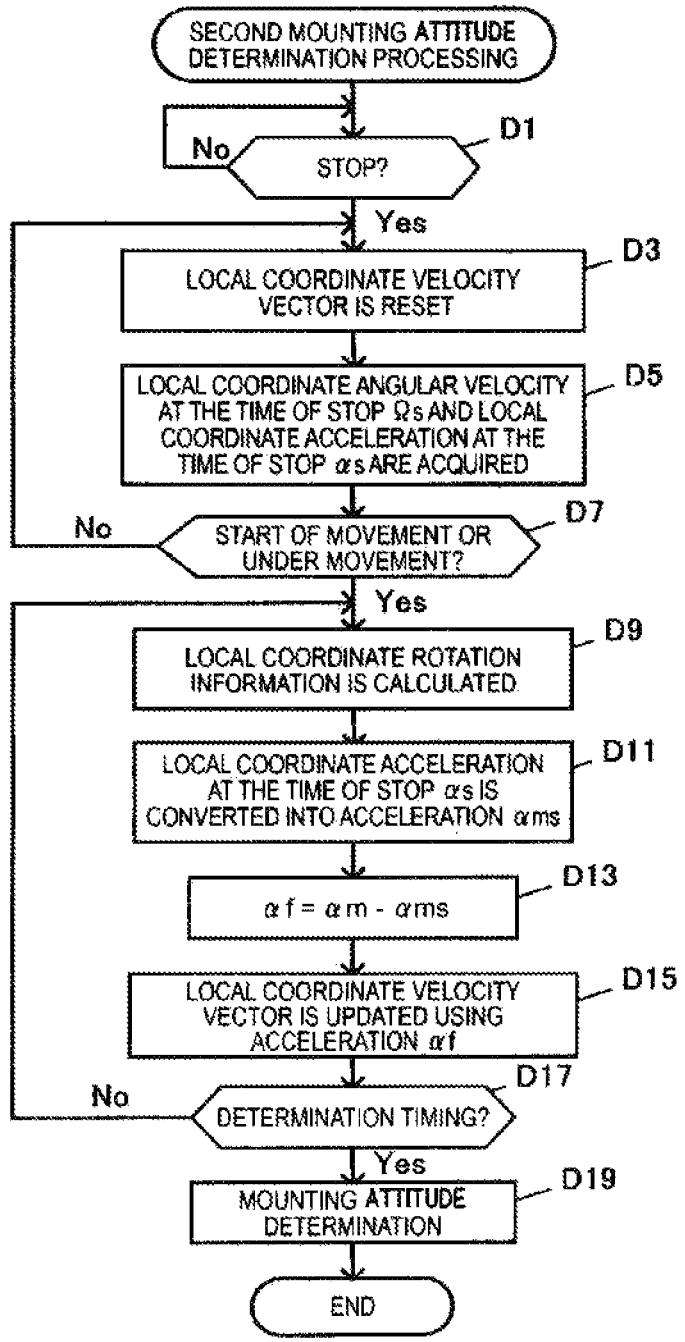
FIG. 21 is a flow chart showing the flow of second mounting attitude determination processing.

In FIG. 21, the processing unit 100 determines whether or not an automobile is in a stop state (step D1). When the automobile is in a stop state, the processing unit 100 resets the local coordinate velocity vector to a zero vector (step D3), and acquires and updates the local coordinate angular velocity and the local coordinate acceleration vector measured by the IMU 400 as measurement data at the time of stop (step D5). In this case, the local coordinate angular velocity is referred to as a local coordinate angular velocity at the time of stop $\Omega s$, and the local coordinate acceleration is referred to as local coordinate acceleration at the time of stop $\alpha s$.

While the stop state continues, steps D3 to D5 are repeatedly performed. When it is determined that the stop is released and the automobile has started to move (step D7; YES), the processing unit 100 proceeds to the next processing. Here, the local coordinate angular velocity and the local coordinate acceleration measured by the IMU 400 during movement are denoted by reference numerals $\Omega m$ and $\alpha m$, respectively, for the following explanation. First, rotation information of the local coordinate is calculated (step D9). Specifically, a time change (time differential) of the local coordinate angular velocity $\Omega m$ with respect to the local coordinate angular velocity at the time of stop $\Omega s$ is integrated and added. This value indicates rotation of the coordinate system itself with respect to the local coordinate system at the time of stop, that is, local coordinate rotation information.

Then, the local coordinate acceleration vector at the time of stop $\alpha s$ is converted into acceleration $\alpha m s$ in the local coordinate system, which is measured by the IMU 400, by inverse transformation using the local coordinate rotation information calculated in step D9 (step D11). Then, by taking a difference between the local coordinate acceleration $\alpha m$ measured by the IMU 400 and the converted acceleration $\alpha m s$, acceleration $\alpha f$ at the corresponding point of time is calculated (step D13). The converted acceleration $\alpha m s$ and the acceleration $\alpha m$ in the local coordinate system measured by the IMU 400 are acceleration on the same local coordinate system. In addition, even if there is a bias error in both the acceleration vectors, the bias error is offset as a result of the error calculation. In addition, the acceleration of gravity is also offset. Therefore, the vector $\alpha f$ related to the pure acceleration of the automobile itself in the local coordinate system which is measured by the IMU 400 is obtained.

Then, the local coordinate velocity vector is updated using the obtained acceleration vector $\alpha f$ (step D15). In the case of first updating, a velocity vector immediately after the start of movement in the local coordinate system at the time of stop is obtained since the local coordinate velocity vector reset in step D3 is updated for the first time. Then, processing of steps D9 to D15 is repeated until the mounting attitude determination timing (step D17). The mounting attitude determination timing is preferably determined on the basis of whether or not the mounting attitude determination activation condition in step A13 of FIG. 12 is satisfied. At the attitude determination timing, the mounting attitude is determined on the basis of the newest local coordinate velocity vector using the above-described Expressions (2) and (3) (step D19).

The second mounting attitude determination processing described above is preferably executed in parallel during the execution of navigation processing. For example, a step of starting the execution of the second mounting attitude determination processing is added between steps A3 and A5 of FIG. 12 or FIG. 16. In this case, since the second mounting attitude determination processing becomes processing which replaces the mounting attitude determination processing executed in step A15 of FIG. 12 or FIG. 16, the mounting attitude determination processing may not be performed in step A15.

In addition, tests to check the effect of the second mounting attitude determination processing were performed. A determination result of the known mounting attitude determination processing and a determination result of the second mounting attitude determination processing when bias errors were caused in the x and z axes of the local coordinate system were compared with each other. In the first test in which a bias error of +1 [mG] was caused in the x axis and a bias error of −1 [mG] was caused in the z axis, an error of the yaw angle was −3.40 [deg] and an error of the pitch angle was +5.53 [deg] in the known mounting attitude determination processing. On the other hand, in the second mounting attitude determination processing, an error of the yaw angle was +0.06 [deg] and an error of the pitch angle was −0.01 [deg]. Moreover, in the second test in which a bias error of +100 [mG] was caused in the x axis and a bias error of −100 [mG] was caused in the z axis, an error of the yaw angle was +74.26 [deg] and an error of the pitch angle was −34.30 [deg] in the known mounting attitude determination processing. On the other hand, in the second mounting attitude determination processing, an error of the yaw angle was +0.05 [deg] and an error of the pitch angle was +0.00 [deg].

4-8. Moving Body

The present invention can be applied to various kinds of moving bodies. A preferable application example is a four-wheeled vehicle. However, if constraints on the movement direction that vertical or horizontal movement is not performed at the time of movement can be imposed, the present invention may also be applied to moving bodies involving two-wheeled vehicles or bicycles, trains, ships, and human beings, for example.

4-9. Electronic Apparatus

In the above example, the case where the present invention is applied to the car navigation apparatus has been described as an example. However, electronic apparatuses to which the present invention can be applied are not limited to this. For example, the present invention may also be applied to other electronic apparatuses, such as portable navigation apparatuses (portable navigation) or mobile phones, personal computers, and PDAs.

The invention claimed is:

1. An attitude determination method comprising:
measuring local coordinate movement vectors $v_x^L$, $v_y^L$, and $v_z^L$ by a sensor system which is mounted in a moving body and measures the movement vectors, wherein $v_x^L$ is a velocity vector in a local coordinate system in an X direction, $v_y^L$ is a velocity vector in a local coordinate system in a Y direction, and $v_z^L$ is a velocity vector in a local coordinate system in a Z direction;
measuring an absolute coordinate attitude measurement in an absolute coordinate system by the sensor system;
converting the local coordinate movement vectors into absolute coordinate movement vectors using the absolute coordinate attitude measurement; and
determining an attitude of the sensor with respect to the moving body using the absolute coordinate movement vectors and the absolute coordinate attitude measurement after the moving body starts to move from a stop position and has reached a predetermined threshold velocity or a predetermined threshold acceleration,
wherein the determining the attitude of the sensor is delayed until the moving body has reached the predetermined threshold velocity or the predetermined threshold acceleration following the stop position.

2. The attitude determination method according to claim 1, further comprising:
compensating for a measurement result of the sensor system using a first constraint condition regarding a velocity of the moving body when the moving body is in a stop state.

3. The attitude determination method according to claim 1, wherein the step of determining the attitude does not determine a roll component of the attitude with respect to the moving body.

4. A position calculation method comprising:
a step of determining the attitude using the attitude determination method according to claim 1; and
a step of calculating a position of the moving body using the attitude and the movement vector.

5. The position calculation method according to claim 4, wherein the step of calculating the position includes:
a step of calculating an absolute coordinate position of the moving body in the absolute coordinate system;
a step of performing coordinate transformation of the absolute coordinate position to a moving body coordinate position based on the moving body using the attitude and a direction of the sensor system expressed in the absolute coordinate system; and
a step of correcting the absolute coordinate position using the moving body coordinate position and a second constraint condition regarding a movement direction of the moving body.

6. An attitude determination method comprising:
measuring local coordinate movement vectors $v_x^L$, $v_y^L$, and $v_z^L$ by a sensor system which is mounted in a moving body and measures the movement vectors, wherein $v_x^L$ is a velocity vector in a local coordinate system in an X direction, $v_y^L$ is a velocity vector in a local coordinate system in a Y direction, and $v_z^L$ is a velocity vector in a local coordinate system in a Z direction;
measuring an absolute coordinate attitude measurement in an absolute coordinate system by the sensor system;
converting the local coordinate movement vectors into absolute coordinate movement vectors using the absolute coordinate attitude measurement and
determining an attitude of the sensor with respect to the moving body using the absolute coordinate movement vectors and the absolute coordinate attitude measurement after the moving body starts to move from a stop position and has reached a predetermined threshold velocity or a predetermined threshold acceleration,
wherein the determining the attitude of the sensor is delayed until the moving body has reached the predetermined threshold velocity or the predetermined threshold acceleration following the stop position.

* * * * *